US012762335B2

(12) United States Patent
Lee et al.

(10) Patent No.: US 12,762,335 B2
(45) Date of Patent: Oct. 13, 2026

(54) ELECTRONIC APPARATUS FOR GENERATING INPUT PROMPT FOR LANGUAGE MODEL, AND CONTROLLING METHOD THEREOF

(71) Applicant: SAMSUNG ELECTRONICS CO., LTD., Suwon-si (KR)

(72) Inventors: Kangwook Lee, Suwon-si (KR); Chiyoun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 208 days.

(21) Appl. No.: 18/230,393

(22) Filed: Aug. 4, 2023

(65) Prior Publication Data

US 2024/0143916 A1 May 2, 2024

Related U.S. Application Data

(63) Continuation of application No. PCT/KR2023/010241, filed on Jul. 18, 2023.

(30) Foreign Application Priority Data

Nov. 1, 2022 (KR) ........................ 10-2022-0143966

(51) Int. Cl.
*G10L 15/22* (2006.01)
*G06F 40/20* (2020.01)
*G10L 15/16* (2006.01)

(52) U.S. Cl.
CPC .................................... *G06F 40/20* (2020.01)

(58) Field of Classification Search
CPC ................................ G10L 15/22; G10L 15/16
See application file for complete search history.

(56) References Cited

U.S. PATENT DOCUMENTS 6,795,808 B1 9/2004 Strubbe et al.
8,234,291 B2 7/2012 Ye et al.
(Continued)

FOREIGN PATENT DOCUMENTS

JP 2004-145014 A 5/2004
JP 2010-507153 A 3/2010
(Continued)

OTHER PUBLICATIONS

Ouyang, Long, et al. "Training language models to follow instructions with human feedback." Advances in neural information processing systems 35 (Mar. 4, 2022): 27730-27744. (Year: 2022).*
(Continued)

*Primary Examiner* — Jialong He
(74) *Attorney, Agent, or Firm* — Sughrue Mion, PLLC

(57) ABSTRACT

An electronic apparatus, including a memory configured to store a plurality of sample prompts; a communication interface configured to communicate with a server including a large language model; and at least one processor configured to: acquire user input of a user, select a sample prompt corresponding to the user input from among the stored plurality of sample prompts, acquire additional information corresponding to the user input, acquire an input prompt based on the user input, the sample prompt, and the additional information, transmit the input prompt to the server using the communication interface; and based on receiving response information corresponding to the input prompt from the server through the communication interface, provide the response information to the user.

12 Claims, 28 Drawing Sheets

(56) References Cited

U.S. PATENT DOCUMENTS

| | | | | |
|---|---|---|---|---|
| 8,589,163 | B2 | 11/2013 | Ljolje et al. | |
| 9,875,296 | B2 | 1/2018 | Lu et al. | |
| 10,860,948 | B2 | 12/2020 | Takaai | |
| 11,348,694 | B2 | 5/2022 | Kim et al. | |
| 2010/0094887 | A1 | 4/2010 | Ye et al. | |
| 2014/0310001 | A1* | 10/2014 | Kalns | G10L 15/30 704/270.1 |
| 2017/0046625 | A1 | 2/2017 | Takaai | |
| 2017/0076724 | A1 | 3/2017 | Park et al. | |
| 2017/0242886 | A1* | 8/2017 | Jolley | G06F 40/211 |
| 2017/0277993 | A1* | 9/2017 | Beaver | G06Q 30/0201 |
| 2018/0211663 | A1 | 7/2018 | Shin et al. | |
| 2020/0058299 | A1 | 2/2020 | Lee et al. | |
| 2021/0065685 | A1* | 3/2021 | Hwang | G10L 15/063 |
| 2021/0291363 | A1 | 9/2021 | Sarkar et al. | |
| 2022/0028138 | A1 | 1/2022 | Beaver et al. | |
| 2022/0114463 | A1 | 4/2022 | Tumuluri | |
| 2022/0229832 | A1* | 7/2022 | Li | G06F 16/24578 |
| 2022/0343076 | A1 | 10/2022 | Saito et al. | |
| 2023/0196018 | A1* | 6/2023 | Rozen | G06F 40/56 704/9 |

FOREIGN PATENT DOCUMENTS

| | | | |
|---|---|---|---|
| JP | 6544131 | B2 | 7/2019 |
| JP | 7058438 | B2 | 4/2022 |
| KR | 10-2015-0006116 | A | 1/2015 |
| KR | 10-2017-0032114 | A | 3/2017 |

OTHER PUBLICATIONS

Brown et al., "Language Models are Few-Shot Learners," 34th Conference on Neural Information Processing Systems (NeurIPS 2020), 2020, Total 25 pages.

Thoppilan et al., "LaMDA: Language Models for Dialog Applications," arXiv:2201.08239v3 [cs.CL], Feb. 2022, Total 47 pages.

Peng et al., "GODEL: Large-Scale Pre-Training for Goal-Directed Dialog," arXiv:2206.11309v1 [cs.CL], Jun. 2022, Total 14 pages.

International Search Report and Written Opinion (PCT/ISA/210 and PCT/ISA/237) dated Nov. 3, 2023, issued by International Searching Authority for International Application No. PCT/KR2023/010241.

Extended European Search Report issued Aug. 13, 2025 by the European Patent Office for EP Patent Application No. 23885950.8.

* cited by examiner

FIG. 10

| CATEGORY | PROMPT NUMBER | PROMPT NAME | NOTE |
|---|---|---|---|
| WEATHER | #01-1 | WEATHER 1 | WEATHER |
| WEATHER | #01-2 | WEATHER 2 | WEATHER & TEMPERATURE |
| WEATHER | #01-3 | WEATHER 3 | WEATHER, TEMPERATURE & HUMIDITY |
| QUESTION ANSWERING | #02 | QUESTION ANSWERING | |
| CONTROL CODE | #03 | CONTROL CODE | |
| CHATBOT | #04-1 | CHATBOT 1 | TEXT |
| CHATBOT | #04-2 | CHATBOT 2 | TEXT & EMOJI |
| CHATBOT | #04-3 | CHATBOT 3 | CONTROL TEXT, EMOJI & ANOTHER APPLICATION |

1010

ELECTRONIC APPARATUS FOR GENERATING INPUT PROMPT FOR LANGUAGE MODEL, AND CONTROLLING METHOD THEREOF

CROSS-REFERENCE TO RELATED APPLICATIONS

This application is a bypass continuation of International Application No. PCT/KR2023/010241, filed on Jul. 18, 2023, which is based on and claims priority to Korean Patent Application No. 10-2022-0143966, filed on Nov. 1, 2022, in the Korean Intellectual Property Office, the disclosures of which are incorporated by reference herein in their entireties.

BACKGROUND

1. Field

Apparatuses and methods consistent with the disclosure relate to an electronic apparatus and a controlling method thereof, and more particularly, to an electronic apparatus which provides response information corresponding to user input based on a language model, and a controlling method thereof.

2. Description of Related Art

An electronic apparatus may perform a voice assistant function using a language model. The voice assistant function may be a function of providing a response to user input. Based on receiving the user input through text or voice, a voice assistant device may provide the response to the user input.

The language model may be trained by learning data. However, the language model may not perform a learning operation in real time, and it may thus be difficult for the language model to reflect information which changes in real time. For example, a time point at which the user input is received may be in the present, whereas a learning time point may be in the past. Accordingly, the language model providing the response to the user input may generate output data based on past learning data.

In addition, even though the language model may be trained using the learning data, the language model may fail to provide response information depending on the user input or a degree of learning. Information included in the user input may be insufficient to generate a complete response. In addition, a range of the learning data may be limited to a specific field, and the language model may process the user input in a field where the model is unable to provide an accurate response. In this case, the language model may fail to provide the accurate response to a user.

Based on the information included in the user input being insufficient, the language model may request the user to repeat his or her utterance. However, the user may feel uncomfortable based on receiving a request for the re-utterance. In addition, the response information may have lower informativeness or lower user satisfaction based on being provided based on only the user input.

SUMMARY

Provided are an electronic apparatus which may provide response information based on user input and a prompt including additional information, and a controlling method thereof.

Additional aspects will be set forth in part in the description which follows and, in part, will be apparent from the description, or may be learned by practice of the presented embodiments.

In accordance with an aspect of the disclosure, an electronic apparatus includes a memory configured to store a plurality of sample prompts; a communication interface configured to communicate with a server including a large language model; and at least one processor configured to: acquire user input of a user, select a sample prompt corresponding to the user input from among the stored plurality of sample prompts, acquire additional information corresponding to the user input, acquire an input prompt based on the user input, the sample prompt, and the additional information, transmit the input prompt to the server using the communication interface; and based on receiving response information corresponding to the input prompt from the server through the communication interface, provide the response information to the user.

The sample prompt may include at least one of description information representing the sample prompt, example information, and response structure information.

The at least one processor may be further configured to: identify a task corresponding to the user input, and select the sample prompt based on the identified task.

The server may be a first server, and the at least one processor may be further configured to: determine whether the additional information corresponding to the user input is to be used, transmit a signal requesting the additional information to a second server using the communication interface based on determining that the additional information is to be used, and receive the additional information from the second server using the communication interface.

The at least one processor may be further configured to: acquire a first probability of generating a complete response based on the user input, and acquire the additional information based on the first probability being less than a threshold probability.

The at least one processor may be further configured to: acquire a second probability of generating the complete response based on the user input and at least one piece of sample additional information from among a plurality of pieces of sample additional information, and acquire the additional information based on at least one piece of sample additional information based on the second probability being greater than or equal to the threshold probability.

The at least one processor may be further configured to acquire the input prompt by combining the sample prompt with the user input and the additional information.

The at least one processor may be further configured to: acquire a user log corresponding to user activity within a threshold time, and select the sample prompt based on the user log and the user input.

The at least one processor may be further configured to: acquire a user log corresponding to user activity within a threshold time, and acquire the additional information based on the user log and the user input.

The user input may include at least one of audio information, text information, and image information.

In accordance with an aspect of the disclosure, a method of controlling an electronic apparatus configured to store a plurality of sample prompts and communicate with a server including a large language model, includes acquiring user input of a user; selecting a sample prompt corresponding to the user input from among the stored plurality of sample prompts; acquiring additional information corresponding to the user input; acquiring an input prompt based on the user input, the sample prompt, and the additional information; transmitting the input prompt to the server; and based on response information corresponding to the input prompt being received from the server, provide the response information to the user.

The sample prompt may include at least one of description information representing the sample prompt, at least one example information, and response structure information.

The selecting of the sample prompt may include: identifying a task corresponding to the user input, and selecting the sample prompt based on the identified task.

The server may be a first server, and the acquiring of the additional information may include: determining whether the additional information corresponding to the user input is necessary is to be used, transmitting a signal requesting the additional information to a second server based on the additional information being determined to be used, and receiving the additional information from the second server.

The acquiring of the additional information may include: acquiring a first probability of generating a complete response based on the user input, and acquiring the additional information based on the first probability being less than a threshold probability.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a view for explaining a category of the sample prompt, according to an embodiment;

DETAILED DESCRIPTION

Figure 1:
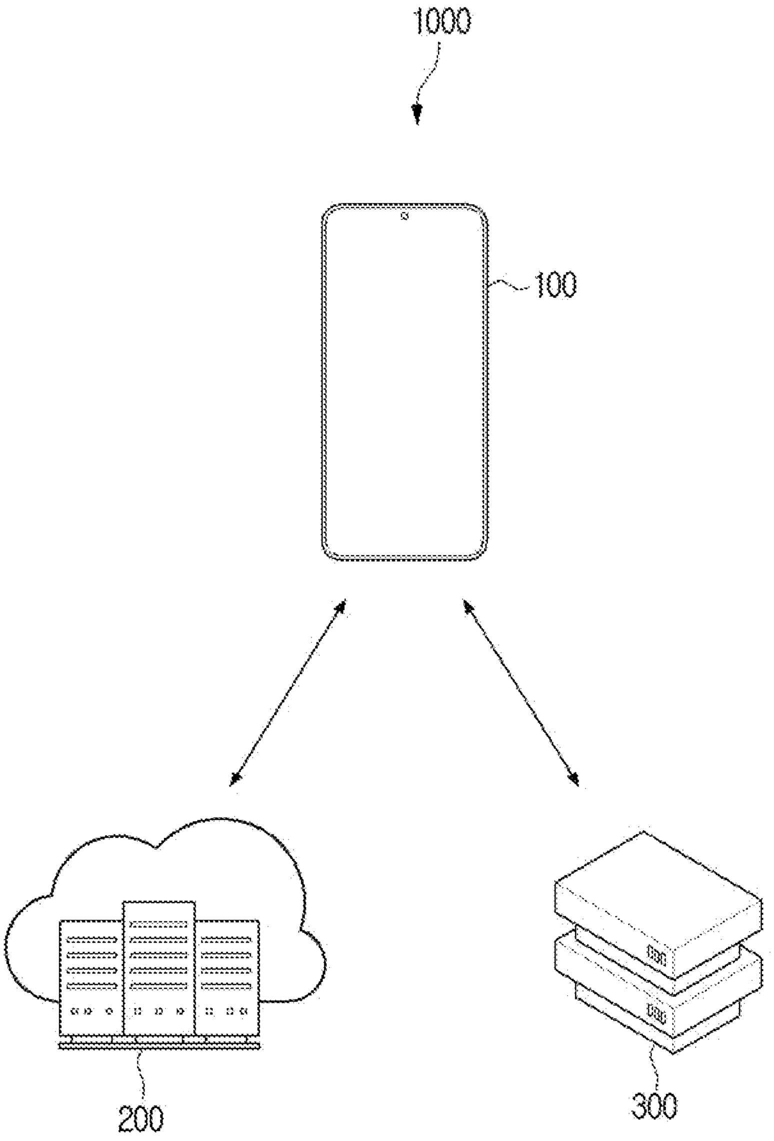
FIG. 1 is a view for explaining a system including an electronic apparatus and at least one external server, according to an embodiment.

Hereinafter, embodiments are described in detail with reference to the accompanying drawings.

General terms may be used to describe embodiments of the disclosure in consideration of their functions in the disclosure. However, these terms may be changed depending on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding descriptions of the disclosure. Therefore, the terms used in the disclosure may be defined on the basis of the meanings of the terms and the contents throughout the disclosure rather than simple names of the terms.

As used herein, expressions such as "have," "may have," "include," "may include," or the like, may indicate the existence of a corresponding feature (for example, a numerical value, a function, an operation or a component such as a part), and does not exclude the existence of an additional feature.

An expression, "at least one of A or/and B" may indicate either "A or B", or "both of A and B."

Expressions "first," "second," or the like, used herein may qualify various components regardless of a sequence or importance of the components. These expressions are used only to distinguish one component from another component, and do not limit the corresponding components.

Based on any component (for example, a first component) being described as "(operatively or communicatively) coupled with/to" or "connected to another component (for example, a second component), it is to be understood that any component may be directly coupled to another component or may be coupled to another component through still another component (for example, a third component).

A term of a singular number may include its plural number unless explicitly indicated otherwise in the context. It is to be understood that a term "include," "formed of," or the like used in this application specifies the existence of features, numerals, steps, operations, components, parts or combinations thereof, which is mentioned in the specification, and does not preclude the existence or addition of one or more other features, numerals, steps, operations, components, parts or combinations thereof.

As used herein, a "module" or a component with a name ending in "~er/~or" may perform at least one function or operation, may be implemented by hardware or software, or be implemented by a combination of hardware and software. In addition, a plurality of "modules" or a plurality of components with names ending in "~ers/~ors" may be integrated in at least one module to be implemented by at least one processor except for a "module" or a component with a name ending in "~er/or" which must be implemented by a specific hardware.

As used herein, such a term as a "user" may refer to a person who uses an electronic apparatus or an apparatus (for example, an artificial intelligence electronic apparatus) which uses the electronic apparatus.

Hereinafter, one or more embodiments of the disclosure are described in detail with reference to the accompanying drawings.

FIG. 1 is a view for explaining a system including an electronic apparatus 100 and at least one external server, for example first server 200 and a second server 300.

Referring to FIG. 1, a system 1000 may include the electronic apparatus 100, and at least one of the first server 200 and the second server 300.

The electronic apparatus 100 may be a device configured to acquire user input. The electronic apparatus 100 may be a device configured to acquire a user voice through a microphone. The electronic apparatus 100 may be a device configured to acquire text information input by a user through a manipulation interface. The electronic apparatus 100 may be a device configured to acquire an image through a camera. The electronic apparatus 100 may provide response information corresponding to the user input. For example, the electronic apparatus 100 may be a smartphone, a television (TV), a tablet personal computer (PC), a laptop computer, or the like.

In addition, the electronic apparatus 100 may transmit the user input to the first server 200. In addition, the electronic apparatus 100 may receive the response information corresponding to the user input from the first server 200. The electronic apparatus 100 may provide the user with the received response information.

The first server 200 may be a server configured to generate the response information. The first server 200 may include a large language understanding model. The first server 200 may generate the response information corresponding to the user input that is transmitted from the electronic apparatus 100, using the large language understanding model. The first server 200 may transmit the generated response information to the electronic apparatus 100.

The second server 300 may be a server configured to provide additional information necessary to generate the response information corresponding to the user input. In embodiments, the additional information necessary to generate the response information may refer to, for example, additional information which is used to generate the response information or useful to generate the response information, or which is determined to be used to generate the response information or determined to be useful to generate the response information. The electronic apparatus 100 may request the additional information from the second server 300, and receive the additional information through the second server 300. The second server 300 may be a database server, a search engine, a calculator application, an image processing application, or the like.

Figure 2:
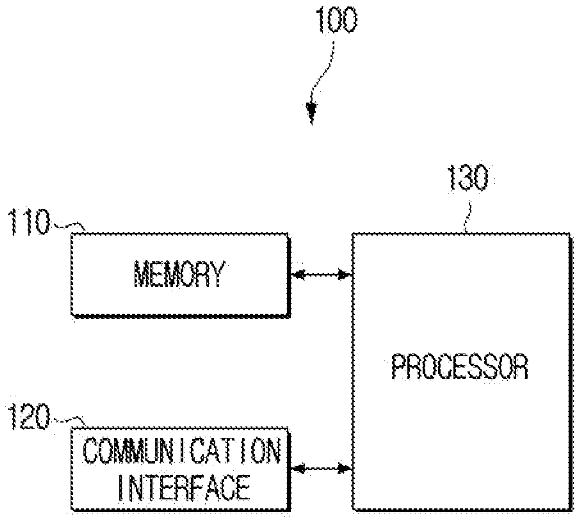
FIG. 2 is a block diagram showing a configuration of the electronic apparatus according to an embodiment.

FIG. 2 is a block diagram showing a configuration of the electronic apparatus 100 according to various embodiments.

Referring to FIG. 2, the electronic apparatus 100 may include at least one of a memory 110, a communication interface 120, and at least one processor 130.

The memory 110 may store a plurality of sample prompts.

The communication interface 120 may communicate with the first server 200 including the large language model.

The at least one processor 130 may be configured to acquire the user input, identifying, determining, or selecting a sample prompt corresponding to the user input from the plurality of stored sample prompts, acquire additional information corresponding to the user input, acquire an input prompt based on the user input, the sample prompt, and the additional information, transmit the input prompt to the first server 200 through the communication interface 120, and provide the response information based on receiving the response information corresponding to the input prompt from the first server 200 through the communication interface 120.

In embodiments, the user input may include at least one of audio information, text information, and image information.

The user input may include the audio information. The audio information may include audio data, or for example an audio signal. The at least one processor 130 may acquire the user input including the audio information. The at least one processor 130 may convert the audio data into the text information using a voice recognition function. An example embodiment in which the audio information is included in the user input is described below with reference to FIG. 14.

According to various embodiments, the voice recognition function may be performed by the external server. The at least one processor 130 may transmit the audio data to the external server, and receive the text information corresponding to the audio data from the external server.

The user input may include the text information. The text information may include character information.

The user input may include the image information. The image information may include image data, or for example an image signal. The at least one processor 130 may identify an object included in the image information. In addition, the response information corresponding to the user input may be acquired based on the object included in the image information. An example embodiment in which the image information is included in the user input is described below with reference to FIGS. 8, 14, and 15.

The at least one processor 130 may select one sample prompt corresponding to the user input from the plurality of sample prompts stored in the memory 110.

In embodiments, the sample prompt may include at least one of description information representing the sample prompt, at least one example information, and response structure information.

The description information may include text indicating a task or field for which the sample prompt is to be used for processing the user input.

The example information may include any user input and any response information corresponding to the user input. The example information may include sample input and a sample response.

Response structure information may include information about a format in which the response information is displayed. For example, a weather sample prompt may include structure information, or for example a format structure, used to generate a response of '1. Today's weather: and 2. Today's temperature:'. The at least one processor 130 may acquire the response to weather as shown in '1. Today's weather: Sunny and 2. Today's temperature: 20 degrees' based on the response structure information.

The sample prompt may be a sample, or for example a specimen, of input data which is input to the large language model. In addition, the sample prompt may indicate form data, style data, type data, or structure data that are the basis of the input data.

The large language model may be a language model which may be universally utilized in various tasks. The large language model may use various types of information in addition to the user input to provide the user with appropriate response information. The large language model may generate the output data through a prompt which is one unit of the input data.

The sample prompt may be the input data used to provide the response information. The sample prompt may include various information used to generate the response information.

The sample prompt may be information used as the input data to acquire the response information. The sample prompt may include at least one of the description information representing the sample prompt and sample data related to the response information. The sample data may be data representing a structure of a plurality of detailed information included in the response information.

The sample prompt may indicate one data group including a plurality of information. Therefore, the sample prompt may be described as a sample group or an input group. In addition, the sample prompt may provide a form of the response information. Therefore, the sample prompt may be described as response format information or the response structure information. An example embodiment related to the sample prompt is described below with reference to FIGS. 9 and 10.

The at least one processor 130 may acquire the additional information corresponding to the user input. The at least one processor 130 may further acquire the additional information in addition to the user input to provide the user with the response information with high utilization.

According to various embodiments, the additional information may be acquired by the electronic apparatus 100. The at least one processor 130 may extract the text information included in the user input, and acquire the additional information related to the text information based on the extracted text information.

According to various embodiments, the additional information may be acquired by the first server 200. The at least one processor 130 may transmit a signal requesting the additional information to the first server 200. The signal requesting the additional information may include the user input. Therefore, the first server 200 may acquire the additional information based on the user input received from the electronic apparatus 100. In addition, the first server 200 may transmit the additional information to the electronic apparatus 100.

According to various embodiments, the at least one processor 130 may generate the input prompt based on the sample prompt and the user input without acquiring the additional information.

The at least one processor 130 may acquire or generate the input prompt based on at least one of the user input, the sample prompt, and the additional information. The input prompt may be input data which is input to the large language model. Example embodiments in which the input prompt is generated are described below with reference to FIGS. 5 to 8.

The large language model may be included in the first server 200. Therefore, at least one processor 130 may transmit the generated input prompt to the first server 200. In addition, the first server 200 may generate the response information based on the input prompt received from at least one processor 130. The first server 200 may transmit the generated response information to the electronic apparatus 100.

The at least one processor 130 may receive the response information from the first server 200. In addition, at least one processor 130 may provide the user with the response information. According to various embodiments, the electronic apparatus 100 may display the response information on a display 140. According to various embodiments, the electronic apparatus 100 may output the response information through a speaker 170.

In embodiments, the at least one processor 130 may identify a task corresponding to the user input, and identify the sample prompt corresponding to the user input from the plurality of sample prompts based on the identified task.

The at least one processor 130 may determine which field of task the user input corresponds to for selecting a sample prompt. The at least one processor 130 may select the task corresponding to the user input from the plurality of tasks stored in the memory 110. Details of an example thereof are provided below with reference to FIG. 11.

In embodiments, the at least one processor 130 may determine whether the additional information corresponding to the user input is necessary, transmit a signal requesting the additional information to the second server 300 through the communication interface 120 based on determining that the additional information is necessary, and receive the additional information from the second server 300 through the communication interface 120.

The at least one processor 130 may determine whether the response information may be generated based on only the user input. The at least one processor 130 may determine whether a complete response corresponding to the user input may be generated through a complete response determination module. An example of a complete response determination module 2300 is described below with reference to FIG. 23.

The at least one processor 130 may determine that the additional information is necessary based on the complete response being not able to be generated based on only the user input. In addition, the at least one processor 130 may request the additional information from the second server 300. The at least one processor 130 may transmit a control signal requesting the additional information to the second server 300. The user input may be included in the transmitted control signal.

The second server 300 may acquire the additional information based on the control signal received from the electronic apparatus 100. In addition, the second server 300 may transmit the acquired additional information to the electronic apparatus 100 again.

The at least one processor 130 may receive the additional information from the second server 300. In addition, the at least one processor 130 may generate the input prompt based on the received additional information, sample prompt, and user input.

In embodiments, the at least one processor 130 may acquire a first probability of generating the complete response based on the user input, and acquire the additional information based on the first probability being less than a threshold probability.

The at least one processor 130 may acquire the probability or possibility of generating the complete response based on the user input. The complete response may indicate a response having a complete form or complete informativeness based on information included in the input data or the user input.

The at least one processor 130 may acquire the probability of generating the complete response through a complete response generation module. The at least one processor 130 may input the input data to the complete response generation module. In addition, the complete response generation module may output, as output data, the probability of generating the complete response, based on the input data.

For example, based on receiving the user input of 'what time is it now?', the at least one processor 130 may determine whether the response information corresponding to the user input ('what time is it now?') is able to be generated. The at least one processor 130 may determine that the complete response is able to be generated based on the electronic apparatus 100 storing information about a current time. The at least one processor 130 may determine that a probability value for generating the complete response is 80% or more. However, the at least one processor 130 may determine that the complete response is not able to be generated based on the electronic apparatus 100 not storing the information about the current time. The at least one processor 130 may determine that the probability value for generating the complete response is less than 10%.

A first probability value may refer to a probability value which is output data based on the input data which is input to the complete response generation module being the user input.

A second probability value may refer to a probability value which is output data based on the input data which is input to the complete response generation module being the user input and sample additional information.

The at least one processor 130 may first acquire the first probability value using only the user input as the input data. In addition, the at least one processor 130 may determine whether the first probability value is less than a threshold probability value.

The at least one processor 130 may determine that the complete response is able to be generated based on only the user input based on the first probability value being greater than or equal to the threshold probability value. The at least one processor 130 may generate the response information based on the user input. The at least one processor 130 may provide the user with the generated response information.

The at least one processor 130 may determine that the complete response is not able to be generated based on only the user input based on the first probability value being less than the threshold probability value. The at least one processor 130 may determine that the response information is not able to be provided to the user based on only the user input based on the first probability value being less than the threshold probability value. The at least one processor 130 may determine that the additional information is necessary in addition to the user input. For example, the at least one processor 130 may determine that the additional information is to be used in addition to the user input.

The at least one processor 130 may identify, determine, or select which additional information is necessary, or is to be used, in addition to the user input.

In embodiments, the at least one processor 130 may acquire a second probability of generating the complete response based on the user input and at least one piece of sample additional information among a plurality of pieces of sample additional information, and identify the additional information based on at least one piece of sample additional information based on the second probability being greater than or equal to the threshold probability.

The electronic apparatus 100 may store the plurality of pieces of sample additional information in the memory 110. The sample additional information may be input data used to acquire a probability of generating the complete response together with the user input. The sample additional information may be described as or referred to as test information, test additional information, dummy information, or dummy additional information. The sample additional information may not be information used to generate the response information, and the sample additional information may simply be information used to acquire a probability value for generating the complete response. The at least one processor 130 may acquire the probability value by inputting each of various pieces of sample additional information together with the user input to the complete response generation module.

There may be a problem determining which piece of sample additional information among the various pieces of sample additional information is to be first input to the complete response generation module together with the user input. The at least one processor 130 may calculate relevance between each of the plurality of pieces of sample additional information and the user input. In addition, the at least one processor 130 may select the sample additional information in order of high relevance. In addition, the at least one processor 130 may input the selected sample additional information and the user input to the complete response generation module.

For example, the electronic apparatus 100 may receive the user input of 'what time is it now?', and may not store the information about the current time. The complete response generation module may determine that the first probability value is 5%. In addition, the at least one processor 130 may determine that the additional information is necessary.

For example, the at least one processor 130 may acquire the input data including time information (e.g., random time information or past time information), which may be the sample additional information, and the user input. In addition, the at least one processor 130 may input the sample additional information (e.g., random time information) and the user input (e.g., 'what time is it now?') as the input data to the complete response generation module. The complete response generation module may determine that the second probability value is 90%. The at least one processor 130 may determine that the additional time information is necessary in addition to the user input.

For example, the at least one processor 130 may acquire the time information as the additional information. The at least one processor 130 may acquire time information of the current time point as the additional information rather than the sample additional information. In addition, the at least one processor 130 may generate the response information based on the additional information (e.g., time information of the current time point) and the user input.

According to various embodiments, the threshold probability compared with the first probability value may be the same the threshold probability compared with the second probability.

According to various embodiments, the threshold probability compared with the first probability value may be different from the threshold probability compared with the second probability value. In this case, the different threshold probabilities may be referred to as a first threshold probability (or a first threshold probability value), and a second threshold probability (or a second threshold probability value). A higher level of complete response may be requested based on the second probability value being calculated by further using the sample additional information in addition to the user input. Therefore, a second threshold probability may have a greater value than the first threshold probability.

Details of examples of the first and second probability values are described with reference with FIGS. 21 to 23.

In embodiments, the at least one processor 130 may acquire the input prompt by combining the sample prompt with the user input and the additional information.

The sample prompt may be form data input to the language model. The sample prompt may include information about storage positions of the user input and the additional information. The at least one processor 130 may store the user input and the additional information in the sample prompt based on the information about the storage position included in the sample prompt. After performing the storage operation, the at least one processor 130 may acquire the sample prompt including the user input and the additional information. Details of an example thereof are described below with reference to FIGS. 5 to 8.

In embodiments, the at least one processor 130 may acquire the user log within a threshold time, and identify the sample prompt corresponding to the user input based on the user log and the user input.

The user log may include at least one of the user input that is input from the electronic apparatus 100, content information (e.g., audio, image, or text) provided based on the user input, instruction information executed based on the user input, and application information executed based on the user input. The user log may be described as log information.

The at least one processor 130 may select one sample prompt from the plurality of sample prompts based on the user log and the user input. The at least one processor 130 may select, identify, or determine the most relevant sample prompt based on the user log and the user input.

In embodiments, the at least one processor 130 may acquire the user log within the threshold time, and acquire the additional information based on the user log and the user input.

The at least one processor 130 may acquire the additional information used to generate the response information using the user log and the user input. The at least one processor 130 may transmit the user log and the user input to the second server 300 based on the additional information being generated by the second server 300.

The second server 300 may generate the additional information based on the received user log and user input. The second server 300 may transmit the generated additional information to the electronic apparatus 100.

The at least one processor 130 may generate the input prompt based on the additional information, the sample prompt, and the user input that are received from the second server 300.

Figure 11:
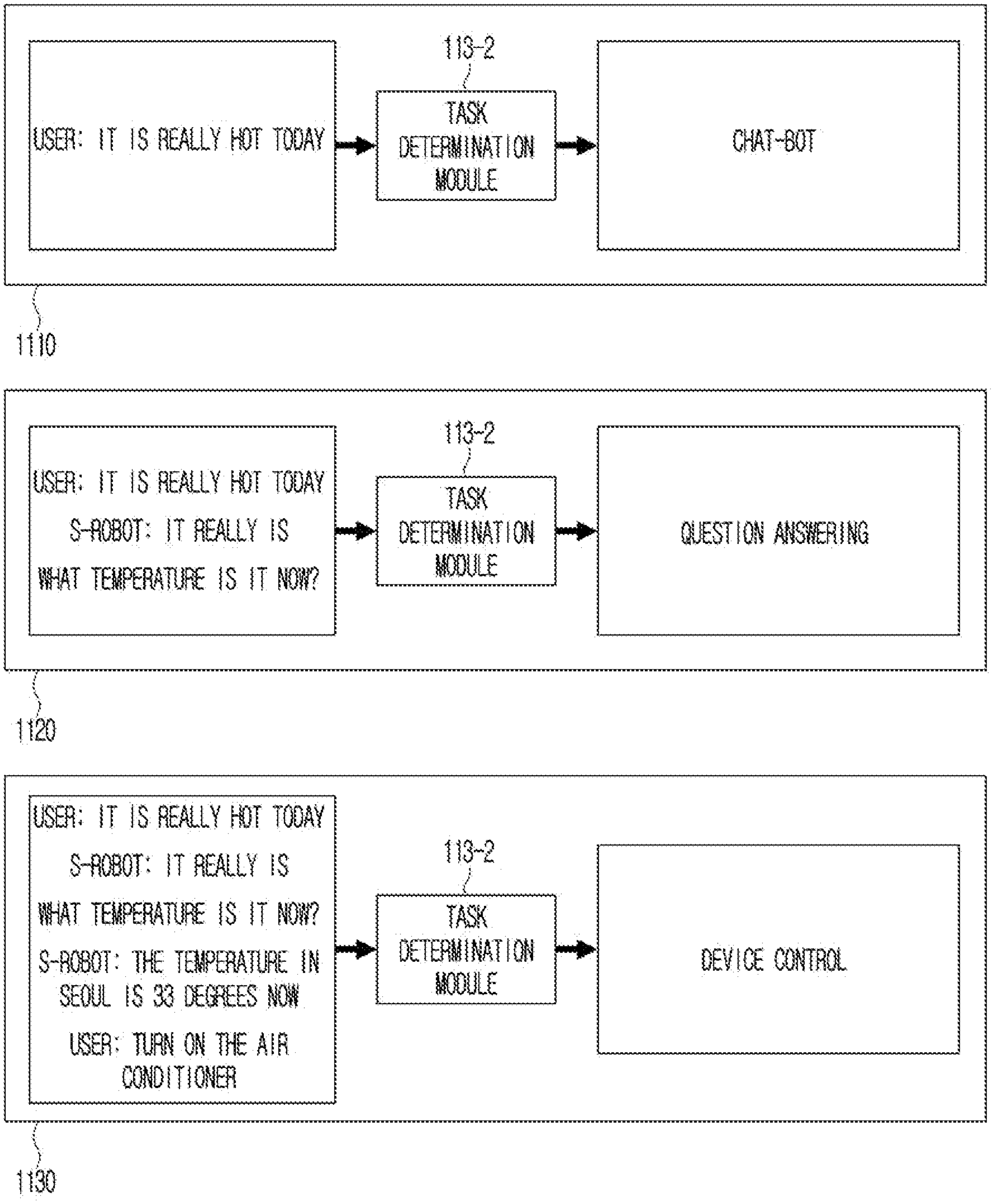
FIG. 11 is a view for explaining an operation of a task determination module according to an embodiment.
Figure 24:
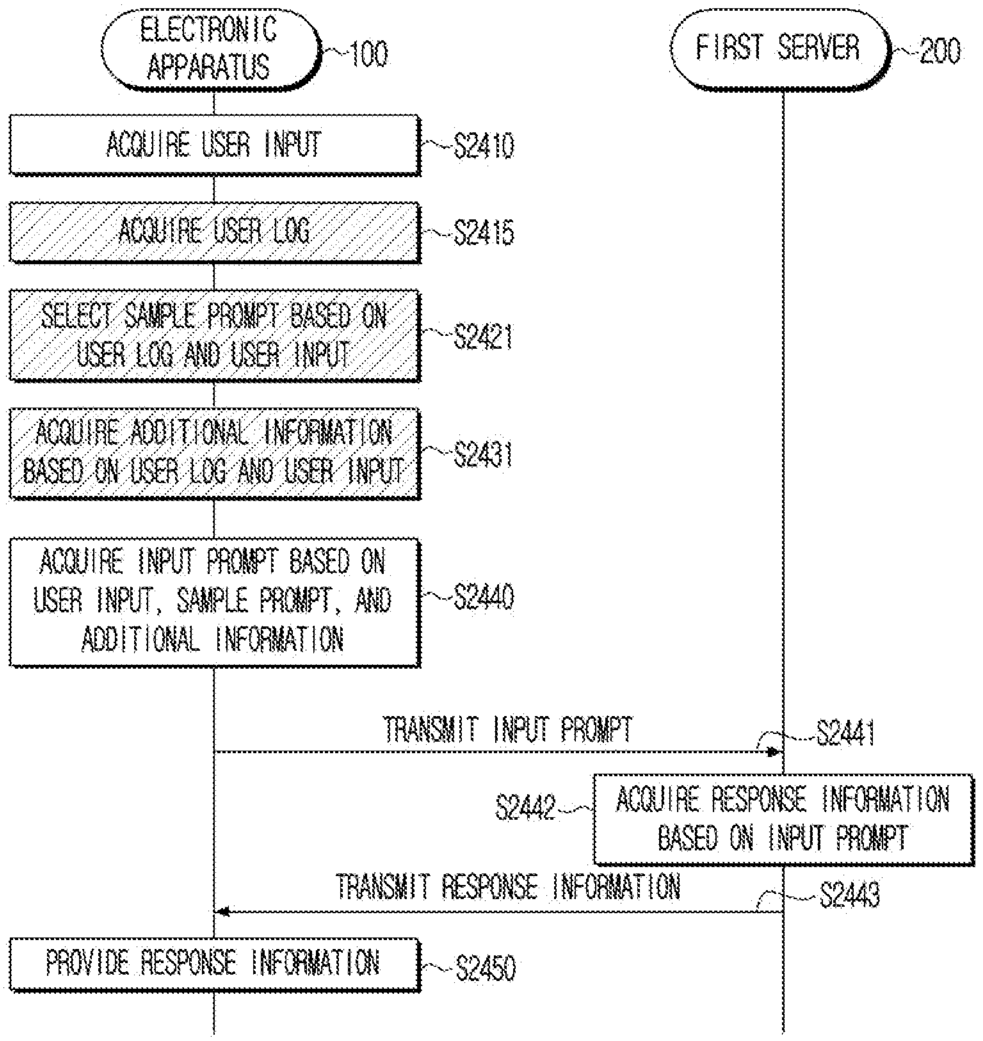
FIG. 24 is a flowchart for explaining an operation of acquiring the input prompt using a user log, according to an embodiment.

A description of an example of the user log is provided with reference to FIGS. 11 and 24.

The electronic apparatus 100 according to various embodiments may acquire the input data which is input to the large language understanding model. The input data may further include various information in addition to the user input. The input data may be the input prompt including sample prompt information (description information, example information, or answer format information), the user input, and the additional information. Various information may be included in the input data in addition to the user input, and the response information may thus have higher completeness. Therefore, the electronic apparatus 100 may provide the user with a high level of response service.

According to various embodiments, the electronic apparatus 100 may acquire the response information by further considering the various information in addition to the user input. Therefore, the electronic apparatus 100 may generate the response information by further considering the sample prompt or the additional information even though the user inputs data insufficient to generate the complete response. Therefore, the response information may have higher informativeness or higher user satisfaction. In addition, the electronic apparatus 100 may provide the user with high-level response information by further considering the sample prompt or the additional information even though the language model used to generate the response information is specialized for a specific category.

In embodiments, the above description shows and describes only a simple configuration of the electronic apparatus 100. However, various configurations may be further provided in its implementation. A description of an example thereof is provided below with reference to FIG. 3.

Figure 3:
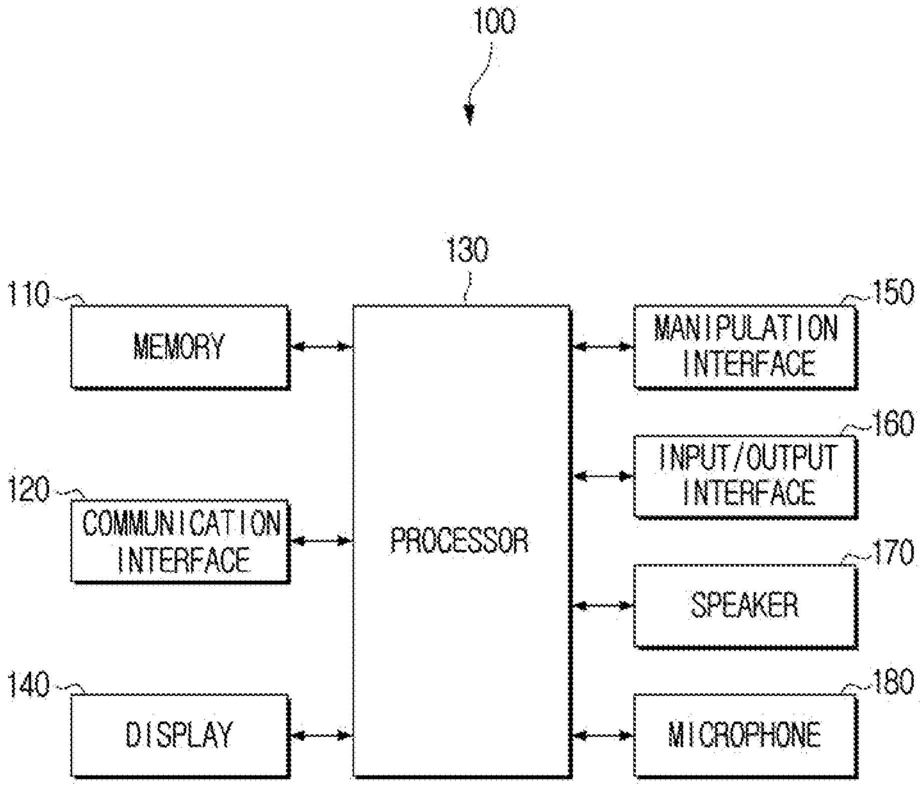
FIG. 3 is a block diagram showing a specific configuration of the electronic apparatus of FIG. 2, according to an embodiment.

FIG. 3 is a block diagram showing a specific configuration of the electronic apparatus 100 of FIG. 2.

Referring to FIG. 3, the electronic apparatus 100 may include at least one of the memory 110, the communication interface 120, the at least one processor 130, the display 140, a manipulation interface 150, an input/output interface 160, the speaker 170, and a microphone 180. The description may omit a redundant description of the same operation as described above.

The electronic apparatus 100 according to various embodiments may include, for example, at least one of a smartphone, a tablet PC, a mobile phone, a desktop PC, a laptop PC, a personal digital assistant (PDA), and a portable multimedia player (PMP). In some embodiments, the electronic apparatus 100 may include, for example, at least one of a television, a digital video disk (DVD) player, and a media box (e.g., Samsung HomeSync™ Apple TV™, or Google TV™).

The memory 110 may be implemented as an internal memory such as a read-only memory (ROM, e.g., electrically erasable programmable read-only memory (EEPROM)) or a random access memory (RAM), included in the processor 130, or as a memory separate from the processor 130. In this case, the memory 110 may be implemented in the form of a memory embedded in the electronic apparatus 100 or in the form of a memory detachable from the electronic apparatus 100, based on a data storing purpose. For example, data for driving the electronic apparatus 100 may be stored in the memory embedded in the electronic apparatus 100, and data for the extended function of the electronic apparatus 100 may be stored in the detachable memory in the electronic apparatus 100.

In embodiments, the memory embedded in the electronic apparatus 100 may be implemented as at least one of a volatile memory (e.g., dynamic RAM (DRAM), static RAM (SRAM) or synchronous dynamic RAM (SDRAM)), a non-volatile memory (e.g., one time programmable ROM (OTPROM)), programmable ROM (PROM), erasable and programmable ROM (EPROM), electrically erasable and programmable ROM (EEPROM)), a mask ROM, a flash ROM, a flash memory (e.g., NAND flash or NOR flash), a hard drive or a solid state drive (SSD); and the memory detachable from the electronic apparatus 100 may be implemented as a memory card (e.g., compact flash (CF), secure digital (SD)), micro secure digital (Micro-SD), mini secure digital (mini-SD), extreme digital (xD), or multi-media card (MMC)) or an external memory which may be connected to a universal serial bus (USB) port (e.g., USB memory), or the like.

The communication interface 120 may be a component configured to communicate with various types of external devices using various types of communication methods. The communication interface 120 may include a wireless communication module and a wired communication module. Here, each communication module may be implemented in the form of at least one hardware chip.

The wireless communication module may be a module configured to communicate with the external device in a wireless manner. For example, the wireless communication module may include at least one of a wireless-fidelity (Wi-Fi) module, a Bluetooth module, an infrared communication module, and other communication modules.

The Wi-Fi module and the Bluetooth module may respectively perform the communication in a Wi-Fi manner and a Bluetooth manner. Based on using the Wi-Fi module or the Bluetooth module, it is possible to first transmit and receive various connection information such as a service set identifier (SSID) or a session key, connect the communication using this connection information, and then transmit and receive various information.

The infrared communication module may perform the communication based on infrared data association (IrDA) technology of transmitting data in a short distance in the wireless manner using an infrared ray between visible and millimeter waves.

In addition to the above-described communication methods, other communication modules may include at least one communication chip configured to perform the communication based on various wireless communication standards such as zigbee, third generation (3G), third generation partnership project (3GPP), long term evolution (LTE), LTE advanced (LTE-A), fourth generation (4G), and fifth generation (5G).

The wired communication module may be a module configured to communicate with the external device in a wired manner. For example, the wired communication module may include at least one of a local area network (LAN) module, an Ethernet module, a pair cable, a coaxial cable, an optical fiber cable, and an ultra wide-band (UWB) module.

The processor 130 may be implemented as a digital signal processor (DSP) configured to process a digital signal, a microprocessor, or a time controller (TCON). However, the processor 130 is not limited thereto, and may include one or more of a central processing unit (CPU), a micro controller unit (MCU), a micro processing unit (MPU), a controller, an application processor (AP), a graphics-processing unit (GPU), a communication processor (CP) or an advanced reduced instruction set computer (RISC) machine (arm) processor, or may be defined by these terms. In addition, the processor 130 may be implemented as a system-on-chip (SoC) or a large scale integration (LSI), in which a processing algorithm is embedded, or may be implemented in the form of a field programmable gate array (FPGA). In addition, the processor 130 may perform various functions by executing computer executable instructions stored in the memory.

The display 140 may be implemented as any of various types of displays such as a liquid crystal display (LCD), an organic light emitting diode (OLED) display, a plasma display panel (PDP), and the like. The display 140 may include a driving circuit, a backlight unit, and the like, which may be implemented in a form such as an amorphous silicon thin film transistor (a-si TFT), a low temperature poly silicon (LTPS) TFT, or an organic TFT (OTFT). In embodiments, the display 140 may be implemented as a touch screen combined with a touch sensor, a flexible display, a three-dimensional (3D) display, or the like. In addition, the display 140 according to one or more embodiments of the disclosure may include not only a display panel outputting an image, but also a bezel housing the display panel. In particular, the bezel may include a touch sensor detecting user interaction according to one or more embodiments of the disclosure.

According to various embodiments, the electronic apparatus 100 may include the display 140. For example, the electronic apparatus 100 may directly display the acquired image or content on the display 140.

According to various embodiments, the electronic apparatus 100 may not include the display 140. The electronic apparatus 100 may be connected to an external display device, and may transmit the image or content stored in the electronic apparatus 100 to the external display device. For example, the electronic apparatus 100 may transmit the image or the content to the external display device together with the control signal controlling the image or the content to be displayed on the external display device. Here, the external display device may be connected to the electronic apparatus 100 through the communication interface 120 or the input/output interface 160. For example, the electronic apparatus 100 may not include the display like a set top box (STB). In addition, the electronic apparatus 100 may include only a small display which may only display simple information such as the text information. Here, the electronic apparatus 100 may transmit the image or the content to the external display device in the wired or wireless manner through the communication interface 120, or transmit the image or the content to the external display device through the input/output interface 160.

The manipulation interface 150 may be implemented in a device such as a button, a touch pad, a mouse or a keyboard, or may be implemented in a touch screen which may also perform a manipulation input function in addition to the above-described display function. Here, the button may be any of various types of buttons such as a mechanical button, a touch pad, or a wheel, which is positioned on any region of a body appearance of the electronic apparatus 100, such as its front surface, side surface, or rear surface.

The input/output interface 160 may be any of a high definition multimedia interface (HDMI), a mobile high-definition link (MHL), a universal serial bus (USB), a display port (DP), a thunderbolt, a video graphics array (VGA) port, a red-green-blue (RGB) port, a D-subminiature (D-SUB) or a digital visual interface (DVI). The input/output interface 160 may receive an input of, or provide an output of, at least one of audio and video signals. In some implementation examples, the input/output interface 160 may include a port inputting and outputting only the audio signal and a port inputting and outputting only the video signal as its separate ports, or may be implemented as a single port inputting and outputting both the audio signal and the video signal. In embodiments, the electronic apparatus 100 may transmit at least one of the audio and video signals to the external device (e.g., external display device or external speaker) through the input/output interface 160. For example, an output port included in the input/output interface 160 may be connected to the external device, and the electronic apparatus 100 may transmit at least one of the audio and video signals to the external device through the output port.

Here, the input/output interface 160 may be connected with the communication interface. The input/output interface 160 may transmit information received from the external device to the communication interface, or transmit information received through the communication interface to the external device.

The speaker 170 may be a component outputting not only various audio data but also various notification sounds or voice messages.

The microphone 180 may be a component receiving the user voice or other sounds and convert the same into the audio data. The microphone 180 may receive the user voice based on being activated. For example, the microphone 180 may be integrated with the electronic apparatus 100 in the upper, front, or side direction of the electronic apparatus 100. The microphone 180 may include various components such as a microphone collecting the user voice in an analog form, an amplifier circuit amplifying the collected user voice, an analog to digital (A/D) converter circuit sampling the amplified user voice and converting the same into a digital signal, and a filter circuit removing a noise component from the converted digital signal.

Figure 4:
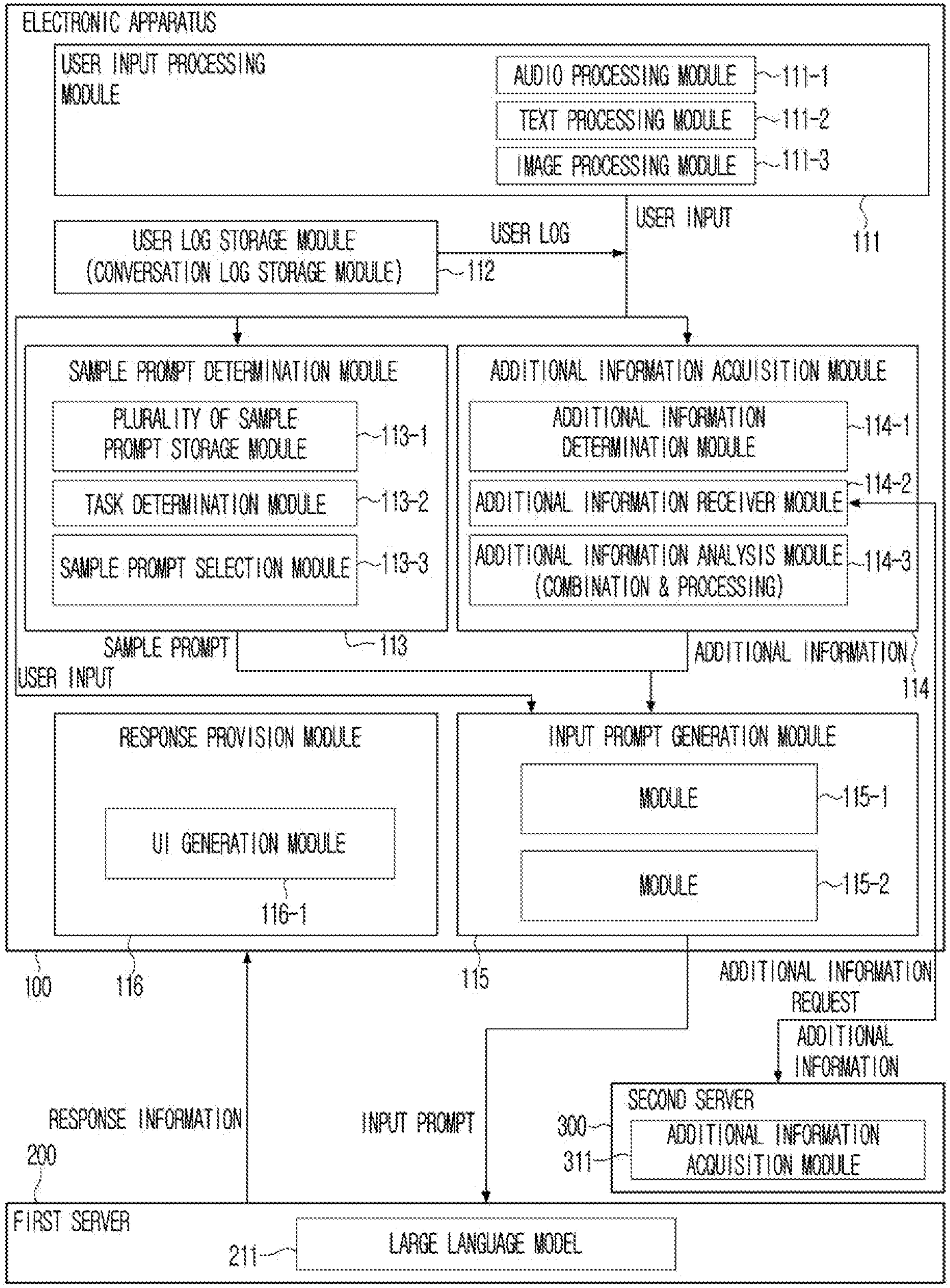
FIG. 4 is a view for explaining a plurality of modules used to provide response information corresponding to user input, according to an embodiment.

FIG. 4 is a view for explaining a plurality of modules used to provide the response information corresponding to the user input.

Referring to FIG. 4, the electronic apparatus 100 may include at least one of a user input processing module 111, a user log storage module 112, a sample prompt determination module 113, an additional information acquisition module 114, and an input prompt generation module 115, or a response provision module 116.

The user input processing module 111 may be a module configured to receive the user input. The user input processing module 111 may include at least one of an audio processing module 111-1, a text processing module 111-2, and an image processing module 111-3.

The audio processing module 111-1 may be a module configured to process audio data acquired through the microphone. The audio data may be an audio analog signal or an audio digital signal. In embodiments, the audio processing module 111-1 may be or include a voice processing module. The audio processing module may convert the audio signal into the text information using a voice recognizer. The audio processing module may determine whether the received audio data is voice data. Based on the audio data being the voice data, the audio processing module may convert the voice data into text data, or for example the text information, using the voice recognizer.

The user input processing module 111 may determine the text information converted using the audio processing module as the user input.

The text processing module 111-2 may be a module configured to process typing data acquired through a keyboard. The text processing module 111-2 may be a module configured to acquire the text information input by the user. The user input processing module 111 may determine the text information as the user input using the text processing module.

The image processing module may be a module configured to process the image data acquired through the camera. The image processing module may be a module configured to convert or change the image data into a form in which the image data is able to be used in another module.

According to various embodiments, the image processing module 111-3 may extract specific information from the image data using an optical character reader (OCR) function. The user input processing module 111 may determine the information extracted using the image processing module as the user input.

According to various embodiments, the image processing module 111-3 may change a resolution of the image data. The user input processing module 111 may determine the image data whose resolution is changed using the image processing module as the user input.

According to various embodiments, the image processing module 111-3 may determine image data itself as the user input without the conversion or change operation.

The user input processing module 111 may transmit the user input to at least one of the sample prompt determination module 113, the additional information acquisition module 114, and the input prompt generation module 115.

The user log storage module 112 may be a module configured to store the user log related to a user behavior. The user log may include at least one of the user input that is input from the electronic apparatus 100, the content information (e.g., audio, image, or text) provided based on the user input, the instruction information executed based on the user input, or the application information executed based on the user input.

The user log storage module 112 may transmit the user log to at least one of the sample prompt determination module 113 and the additional information acquisition module 114.

According to various embodiments, at least one of the sample prompt determination module 113 and the additional information acquisition module 114 may use the user log.

According to various embodiments, none of the sample prompt determination module 113 and the additional information acquisition module 114 may use the user log.

The sample prompt determination module 113 may be a module configured to determine the sample prompt corresponding to the user input among the plurality of sample prompts. The sample prompt determination module 113 may include at least one of a plurality of sample prompt storage modules 113-1, a task determination module 113-2, and a sample prompt selection module 113-3.

The sample prompt may include at least one of the description information representing the sample prompt and the sample data related to the response information. The sample data may be the data representing the structure of the plurality of detailed information included in the response information.

The plurality of sample prompt storage modules 113-1 may store predetermined sample prompts. According to various embodiments, each of the plurality of sample prompts may correspond to a predetermined task. For example, a first sample prompt corresponding to a first task and a second sample prompt corresponding to a second task may be stored in the plurality of sample prompt storage modules 113-1. According to various embodiments, the plurality of sample prompts may correspond to the first task or the second task.

The task determination module 113-2 may be a module configured to determine which task the user input is related to. For example, the task may be a conversation task, a question task, a device control task, or the like. In addition, the task determination module 113-2 may identify the task corresponding to the user input by considering the user log and the user input together.

The sample prompt selection module may be a module configured to select the sample prompt corresponding to the user input from the plurality of sample prompts. The sample prompt selection module 113-3 may select a sample prompt corresponding to the identified task based on the task determination module 113-2 identifying the task corresponding to the user input.

The sample prompt determination module 113 may select, identify, or determine the sample prompt based on at least one of the user input received from the user input processing module 111 or the user log received from the user log storage module 112. The sample prompt determination module 113 may transmit the selected sample prompt to the input prompt generation module 115.

The additional information acquisition module 114 may be a module configured to acquire the additional information corresponding to the user input. The additional information acquisition module 114 may include at least one of an additional information determination module 114-1, an additional information receiver module 114-2, and an additional information analysis module 114-3.

The additional information determination 114-1 module may be a module configured to determine whether the additional information corresponding to the user input is necessary and determining whether any additional information is necessary. The additional information determination module 114-1 may determine whether the complete response is able to be generated based on only the user input.

The additional information determination module 114-1 may determine that the additional information is not necessary based on determining that the complete response is able to be generated based on only the user input. The additional information determination module 114-1 may determine that the additional information is necessary based on determining that the complete response is not able to be generated based on only the user input.

The additional information determination module 114-1 may determine which additional information is necessary to generate the complete response based on determining that the additional information is necessary. The additional information determination module 114-1 may request the determined (or necessary) additional information from the additional information receiver module 114-2.

The additional information receiver module 114-2 may be a module configured to acquire the additional information requested from the additional information determination module.

According to various embodiments, the additional information receiver module 114-2 may acquire the additional information using information in the electronic apparatus 100.

According to various embodiments, the additional information receiver module 114-2 may acquire the additional information through the second server 300. The additional information receiver module 114-2 may request the determined (or necessary) additional information from the second server 300. The second server 300 may acquire or generate the additional information requested by the additional information acquisition module 311 using the additional information acquisition module 114. In addition, the second server 300 may transmit the additional information to the additional information receiver module.

The additional information acquisition module 114 may acquire the additional information through the additional information receiver module.

The additional information analysis module 114-3 may be a module configured to determine whether the acquired or received additional information is data appropriate to be included in the input prompt. The acquired additional information may be in a form inappropriate for the information to be included in the input prompt. In addition, the acquired additional information may have a depth or level difficult for the information to be used to generate the response information. Therefore, the additional information analysis module 114-3 may analyze the received additional information. As a result of the analysis, the additional information analysis module may acquire the processed or detailed additional information.

The additional information acquisition module 114 may transmit the additional information, or for example the processed additional information, to the input prompt generation module 115.

The input prompt generation module 115 may be a module configured to generate the input prompt based on at least one of the user input, the sample prompt, and the additional information. The input prompt generation module 115 may include at least one of a module 115-1 for reflecting the user input to the sample prompt and a module 115-2 for reflecting the additional information to the sample prompt.

The module 115-1 for reflecting the user input to the sample prompt may be a module configured to add the user input, or for example information corresponding to the user input, to a specific sample prompt selected by the sample prompt determination module 113.

The module 115-2 for reflecting the additional information to the sample prompt may be a module configured to add the additional information, or for example the processed additional information, to the specific sample prompt selected by the sample prompt determination module 113.

The input prompt generation module 115 may generate or acquire the input prompt including at least one of the user input and the additional information in the specific sample prompt selected by the sample prompt determination module 113. In addition, the input prompt generation module 115 may transmit the generated input prompt to the first server 200.

The first server 200 may be a server configured to generate the response information corresponding to the input data. The first server 200 may include a large language model 211. The first server 200 may generate the response information corresponding to the input prompt using the large language model. The first server 200 may transmit the generated response information to the response provision module 116.

The response provision module 116 may receive the response information from the first server 200. The response provision module 116 may provide the user with the received response information. The response provision module 116 may include a user interface (UI) generation module 116-1. The response provision module 116 may generate a response UI based on the received response information. In addition, the response provision module 116 may provide the user with the generated response UI. The response UI may include at least one of the audio, the text, and the image.

Figure 5:
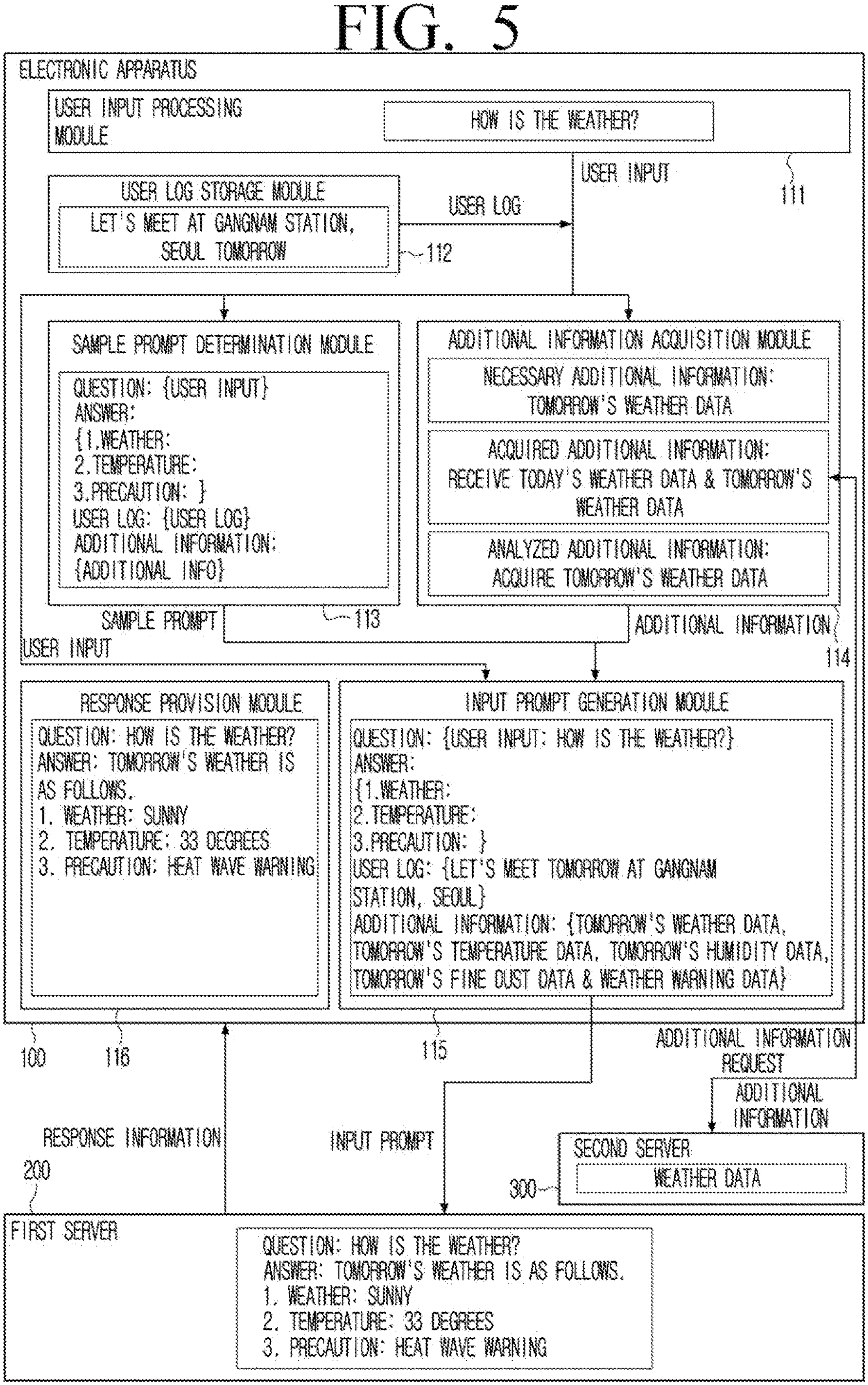
FIG. 5 is a view for explaining a process of providing response information according to an embodiment.

FIG. 5 is a view for explaining a process of providing response information according to various embodiments.

Referring to FIG. 5, the user input processing module 111 may receive user input ('How is the weather?'). The user input may be text information. Based on the user input being voice information, the user input processing module 111 may convert the voice information into the text information.

The user input processing module 111 may transmit the user input ('How is the weather?') to at least one of the sample prompt determination module 113, the additional information acquisition module 114, or the input prompt generation module 115.

The user log storage module 112 may acquire a user log ('Let's meet at Gangnam Station, Seoul tomorrow'). In addition, the user log storage module 112 may transmit the user log ('Let's meet at Gangnam Station, Seoul tomorrow') to at least one of the sample prompt determination module 113, the additional information acquisition module 114, and the input prompt generation module 115.

The sample prompt determination module 113 may receive the user input ('How is the weather?') from the user input processing module 111. In addition, the sample prompt determination module 113 may receive the user log ('Let's meet at Gangnam Station, Seoul tomorrow') from the user log storage module 112. The sample prompt determination module 113 may identify, determine, or select a sample prompt based on at least one of the user input ('How is the weather?') and the user log ('Let's meet at Gangnam Station, Seoul tomorrow'). The sample prompt determination module 113 may transmit the determined sample prompt to the input prompt generation module 115.

The additional information acquisition module 114 may receive the user input ('How is the weather?') from the user input processing module 111. In addition, the additional information acquisition module 114 may receive the user log ('Let's meet at Gangnam Station, Seoul tomorrow') from the user log storage module 112. The additional information acquisition module 114 may determine the additional information based on at least one of the user input ('How is the weather?') and the user log ('Let's meet at Gangnam Station, Seoul tomorrow').

The additional information acquisition module 114 may determine necessary additional information to generate response information corresponding to the user input. The additional information acquisition module 114 may determine the necessary additional information ('tomorrow's weather data'). In addition, the additional information acquisition module 114 may request the necessary additional information from the second server 300. For example, the additional information acquisition module 114 may transmit a control signal requesting the additional information to the user log storage module 112. The control signal may include information for requesting the additional information and the necessary additional information ('tomorrow's weather data').

The second server 300 may acquire weather data based on the additional information request received from the additional information acquisition module 114. The second server 300 may acquire the necessary additional information ('tomorrow's weather data') from the received control signal. In addition, the second server 300 may transmit information ('today's weather data and tomorrow's weather data') corresponding to the necessary additional information ('tomorrow's weather data') to the additional information acquisition module 114. According to various embodiments, the second server 300 may only transmit information requested by the additional information acquisition module 114. However, a module for selectively transmitting only a requested specific data may not exist in the second server 300. The second server 300 may transmit all weather-related data to the additional information acquisition module 114.

The additional information acquisition module 114 may receive the information ('today's weather data and tomorrow's weather data') from the second server 300. The received information ('today's weather data and tomorrow's weather data') may be described as the acquired additional information.

The additional information acquisition module 114 may acquire information corresponding to the necessary additional information by analyzing the acquired additional information. Information acquired by the additional information acquisition module 114 may be described as analyzed additional information.

The additional information acquisition module 114 may acquire final additional information ('tomorrow's weather data') by analyzing the data transmitted by the second server 300. In addition, the additional information acquisition module 114 may transmit the final additional information ('tomorrow's weather data') to the input prompt generation module 115.

The input prompt generation module 115 may receive the user input ('How is the weather?') from the user input processing module 111. In addition, the input prompt generation module 115 may receive the user log ('Let's meet at Gangnam Station, Seoul tomorrow') from the user log storage module 112. In addition, the input prompt generation module 115 may receive the determined sample prompt from the sample prompt determination module 113. In addition, the input prompt generation module 115 may receive the final additional information ('tomorrow's weather data') from the additional information acquisition module 114. The input prompt generation module 115 generate an input prompt based on at least one of the user input ('How is the weather?'), the user log ('Let's meet at Gangnam Station, Seoul tomorrow'), the determined sample prompt, and the additional information ('tomorrow's weather data'). The input prompt generation module 115 may transmit the generated input prompt to the first server 200.

The first server 200 may receive the input prompt from the input prompt generation module 115. In addition, the first server 200 may generate response information based on the received input prompt. The first server 200 may transmit the generated response information to the response provision module 116. The first server 200 may acquire, from an input prompt, at least one of the user input ('How is the weather?'), the user log ('Let's meet at Gangnam Station, Seoul tomorrow'), the determined sample prompt, and the additional information ('tomorrow's weather data'). In addition, the first server 200 may generate the response information based on at least one of the user input ('How is the weather?'), the user log ('Let's meet at Gangnam Station, Seoul tomorrow'), the determined sample prompt, and the additional information ('tomorrow's weather data').

The response provision module 116 may receive the response information from the first server 200. The response provision module 116 may provide the user with the response information received from the first server 200.

Figure 6:
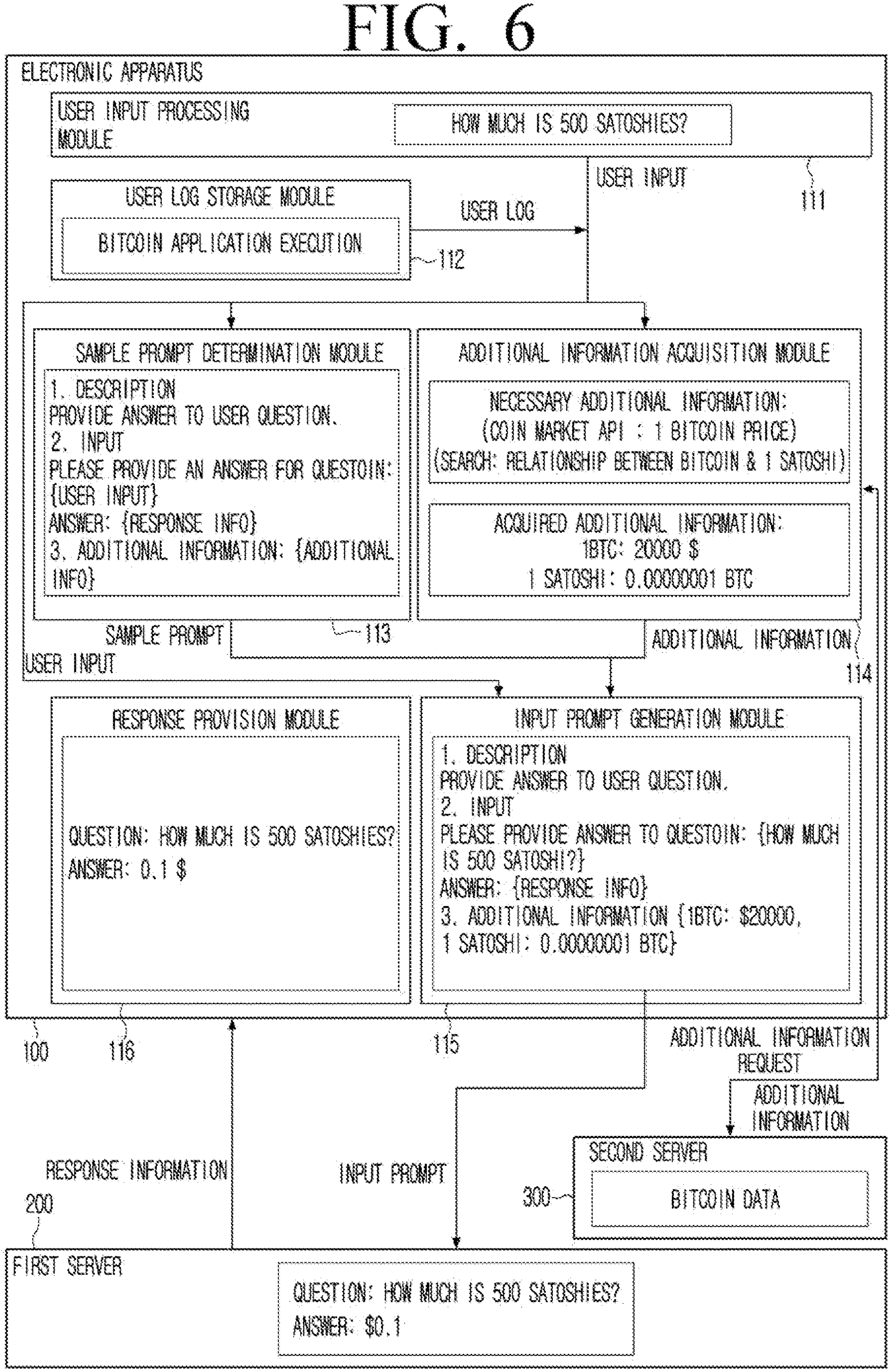
FIG. 6 is a view for explaining a process of providing response information according to an embodiment.

FIG. 6 is a view for explaining a process of providing response information according to various embodiments.

Referring to FIG. 6, the user input processing module 111 may receive user input ('How much is 500 satoshies?'). The user input may be text information. Based on the user input being voice information, the user input processing module 111 may convert the voice information into the text information.

The user input processing module 111 may transmit the user input ('How much is 500 satoshies?') to at least one of the sample prompt determination module 113, the additional information acquisition module 114, and the input prompt generation module 115.

The user log storage module 112 may acquire a user log ('bitcoin application execution'). In addition, the user log storage module 112 may transmit the user log ('bitcoin application execution') to at least one of the sample prompt determination module 113, the additional information acquisition module 114, and the input prompt generation module 115.

The sample prompt determination module 113 may receive the user input ('How much is 500 satoshies?') from the user input processing module 111. In addition, the sample prompt determination module 113 may receive the user log ('bitcoin application execution') from the user log storage module 112. The sample prompt determination module 113 may identify, determine, or select a sample prompt based on at least one of the user input ('How much is 500 satoshies?') and the user log ('How much is 500 satoshies?'). The sample prompt determination module 113 may transmit the determined sample prompt to the input prompt generation module 115.

The additional information acquisition module 114 may receive the user input ('How much is 500 satoshies?') from the user input processing module 111. In addition, the additional information acquisition module 114 may receive the user log ('bitcoin application execution') from the user log storage module 112. The additional information acquisition module 114 may acquire additional information based on at least one of the user input ('How much is 500 satoshies?') and the user log ('bitcoin application execution').

The additional information acquisition module 114 may determine necessary additional information to generate response information corresponding to the user input. The additional information acquisition module 114 may determine the necessary additional information ('price of 1 bitcoin' and 'relationship between bitcoin and 1 satoshi'). In addition, the additional information acquisition module 114 may request the necessary additional information from the second server 300. For example, the additional information acquisition module 114 may transmit a control signal requesting the additional information to the user log storage module 112. The control signal may include information for requesting the additional information and the necessary additional information ('price of 1 bitcoin' and 'relationship between bitcoin and 1 satoshi').

The second server 300 may acquire the 'price of 1 bitcoin' and the 'relationship between bitcoin and 1 satoshi' based on the additional information request received from the additional information acquisition module 114. The second server 300 may acquire the necessary additional information ('price of 1 bitcoin' and 'relationship between bitcoin and 1 satoshi') from the received control signal. In addition, the second server 300 may transmit, to the additional information acquisition module 114, information ('1BTC: $20000' and '1 satoshi: 0.00000001 BTC') corresponding to the necessary additional information ('price of 1 bitcoin' and 'relationship between bitcoin and 1 satoshi'). The additional information acquisition module 114 may receive information ('1BTC: $20000' and '1 satoshi: 0.00000001 BTC') from the second server 300. The received information ('1BTC: $20000' and '1 satoshi: 0.00000001 BTC') may be described as acquired additional information or final additional information.

According to various embodiments, the additional information acquisition module 114 may acquire the final additional information ('1BTC: $20000' and '1 satoshi: 0.00000001 BTC') by analyzing the data transmitted by the second server 300. In addition, the additional information acquisition module 114 may transmit the final additional information ('1BTC: $20000' and '1 satoshi: 0.00000001 BTC') to the input prompt generation module 115. For example, the additional information acquisition module 114 may receive bitcoin-related webpage information from the second server 300. In addition, the additional information acquisition module 114 may acquire the final additional information ('1BTC: $20000' and '1 satoshi: 0.00000001 BTC') by analyzing the received web page information.

The input prompt generation module 115 may receive the user input ('How much is 500 satoshies?') from the user input processing module 111. In addition, the input prompt generation module 115 may receive the user log ('bitcoin application execution') from the user log storage module 112. In addition, the input prompt generation module 115 may receive the determined sample prompt from the sample prompt determination module 113. In addition, the input prompt generation module 115 may receive the final additional information ('price of 1 bitcoin' and 'relationship between bitcoin and 1 satoshi') from the additional information acquisition module 114. The input prompt generation module 115 may generate an input prompt based on at least one of the user input ('How much is 500 satoshies?'), the user log ('bitcoin application execution'), the determined sample prompt, and the additional information ('price of 1 bitcoin' and 'relationship between bitcoin and 1 satoshi'). The input prompt generation module 115 may transmit the generated input prompt to the first server 200.

The first server 200 may receive the input prompt from the input prompt generation module 115. In addition, the first server 200 may generate response information based on the received input prompt. The first server 200 may transmit the generated response information to the response provision module 116. The first server 200 may acquire, from the input prompt, at least one of the user input ('How much is 500 satoshies?'), the user log ('bitcoin application execution'), the determined sample prompt, and the additional information ('price of 1 bitcoin' and 'relationship between bitcoin and 1 satoshi'). In addition, the first server 200 may generate response information based on at least one of the user input ('How much is 500 satoshies?'), the user log ('bitcoin application execution'), the determined sample prompt, or the additional information ('price of 1 bitcoin' and 'relationship between bitcoin and 1 satoshi').

The response provision module 116 may receive the response information from the first server 200. The response provision module 116 may provide the user with the response information received from the first server 200.

Figure 7:
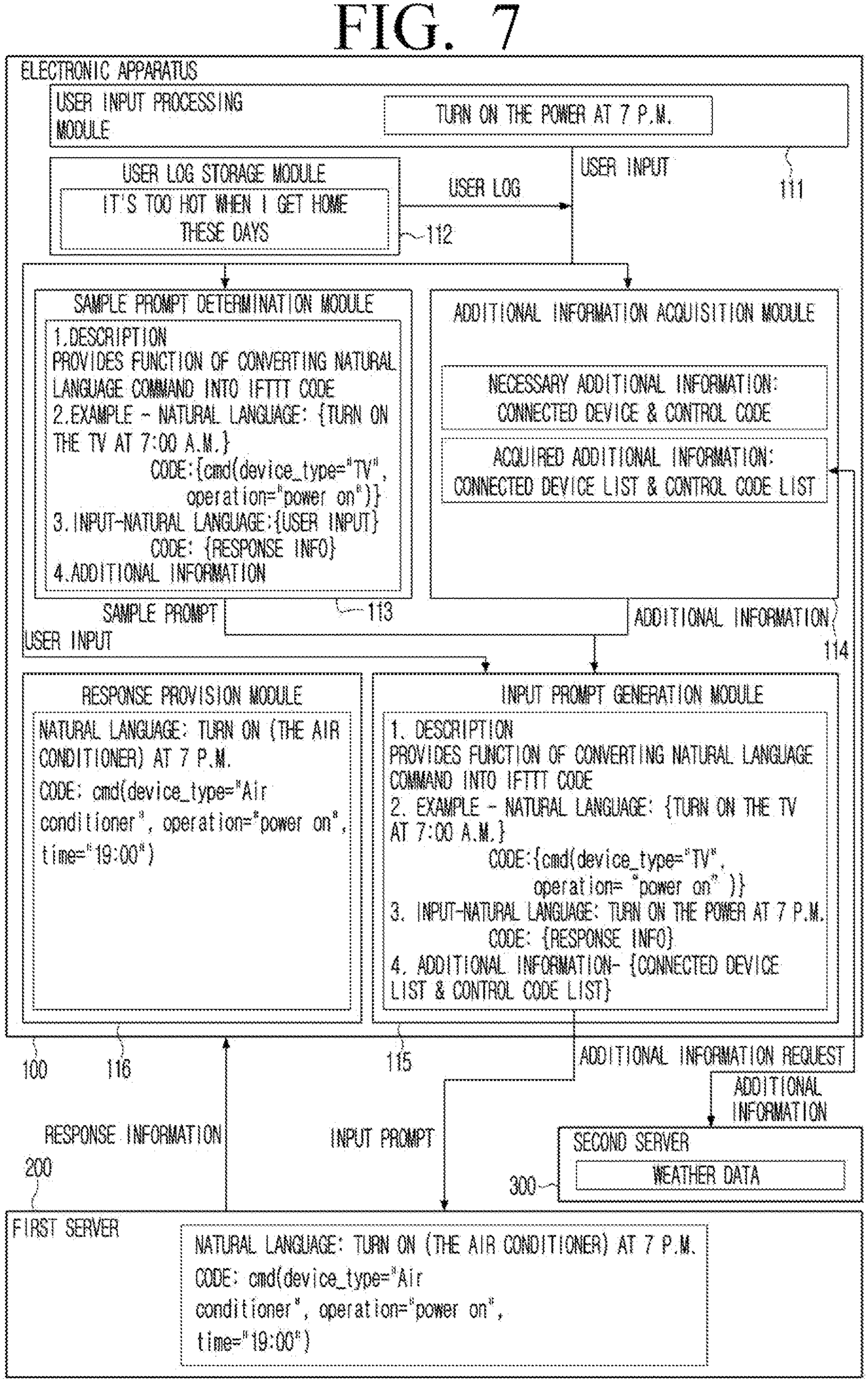
FIG. 7 is a view for explaining a process of providing response information according to an embodiment.

FIG. 7 is a view for explaining a process of providing response information according to various embodiments.

Referring to FIG. 7, the user input processing module 111 may receive user input ('Turn on the power at 7 P.M.'). The user input may be text information. Based on the user input being voice information, the user input processing module 111 may convert the voice information into the text information.

The user input processing module 111 may transmit the user input ('Turn on the power at 7 P.M.') to at least one of the sample prompt determination module 113, the additional information acquisition module 114, and the input prompt generation module 115.

The user log storage module 112 may acquire a user log ('It's too hot when I get home these days'). In addition, the user log storage module 112 may transmit the user log ('It's too hot when I get home these days') to at least one of the sample prompt determination module 113, the additional information acquisition module 114, and the input prompt generation module 115.

The sample prompt determination module 113 may receive the user input ('Turn on the power at 7 P.M.') from the user input processing module 111. In addition, the sample prompt determination module 113 may receive the user log ('It's too hot when I get home these days') from the user log storage module 112. The sample prompt determination module 113 may identify, determine, or select a sample prompt based on at least one of the user input ('Turn on the power at 7 P.M.') and the user log ('It's too hot when I get home these days'). The sample prompt determination module 113 may transmit the determined sample prompt to the input prompt generation module 115.

The additional information acquisition module 114 may receive the user input ('Turn on the power at 7 P.M.') from the user input processing module 111. In addition, the additional information acquisition module 114 may receive the user log ('It's too hot when I get home these days') from the user log storage module 112. The additional information acquisition module 114 may acquire additional information based on at least one of the user input ('Turn on the power at 7 P.M.') and the user log ('It's too hot when I get home these days').

The additional information acquisition module 114 may determine necessary additional information to generate response information corresponding to the user input. The additional information acquisition module 114 may determine the necessary additional information ('connected device' and 'control code'). In addition, the additional information acquisition module 114 may request the necessary additional information from the second server 300. For example, the additional information acquisition module 114 may transmit a control signal requesting the additional information to the user log storage module 112. The control signal may include information for requesting the additional information and the necessary additional information ('connected device' and 'control code').

The second server 300 may acquire a 'connected device list' and a 'control code list' based on the additional information request received from the additional information acquisition module 114. The second server 300 may acquire the necessary additional information ('connected device' and 'control code') from the received control signal. In addition, the second server 300 may transmit the information ('connected device list' and 'control code list') corresponding to the necessary additional information ('connected device' and 'control code') to the additional information acquisition module 114. The additional information acquisition module 114 may receive the information ('connected device list' and 'control code list') from the second server 300. The received information ('connected device list' and 'control code list') may be described as acquired additional information or final additional information.

According to various embodiments, the additional information acquisition module 114 may acquire the final additional information ('connected device list' and 'control code list') by analyzing the data transmitted by the second server 300. In addition, the additional information acquisition module 114 may transmit the final additional information ('connected device list' and 'control code list') to the input prompt generation module 115. For example, the additional information acquisition module 114 may receive management device information from the second server 300. In addition, the additional information acquisition module 114 may acquire the final additional information ('connected device list' and 'control code list') by analyzing the received management device information.

The input prompt generation module 115 may receive the user input ('Turn on the power at 7 P.M.') from the user input processing module 111. In addition, the input prompt generation module 115 may receive the user log ('It's too hot when I get home these days') from the user log storage module 112. In addition, the input prompt generation module 115 may receive the determined sample prompt from the sample prompt determination module 113. In addition, the input prompt generation module 115 may receive the final additional information ('connected device list' and 'control code list') from the additional information acquisition module 114. The input prompt generation module 115 may generate an input prompt based on at least one of the user input ('Turn on the power at 7 P.M.'), the user log ('It's too hot when I get home these days'), the determined sample prompt, and the additional information ('connected device list' and 'control code list'). The input prompt generation module 115 may transmit the generated input prompt to the first server 200.

The first server 200 may receive the input prompt from the input prompt generation module 115. In addition, the first server 200 may generate response information based on the received input prompt. The first server 200 may transmit the generated response information to the response provision module 116. The first server 200 may acquire, from the input prompt, at least one of the user input ('Turn on the power at 7 P.M.'), the user log ('It's too hot when I get home these days'), the determined sample prompt, and the additional information ('connected device list' and 'control code list'). In addition, the first server 200 may generate response information ('instruction information for turning on the air conditioner') based on at least one of the user input ('Turn on the power at 7 P.M.'), the user log ('It's too hot when I get home these days'), the determined sample prompt, and the additional information ('connected device list' and 'control code list').

The response provision module 116 may receive the response information ('instruction information for turning on the air conditioner') from the first server 200. The response provision module 116 may provide the user with the response information ('instruction information for turning on the air conditioner') received from the first server 200. According to various embodiments, the response provision module 116 may execute a reservation instruction to turn on power of the air conditioner at a time point (of 7:00 P.M.) corresponding to the user input.

Figure 8:
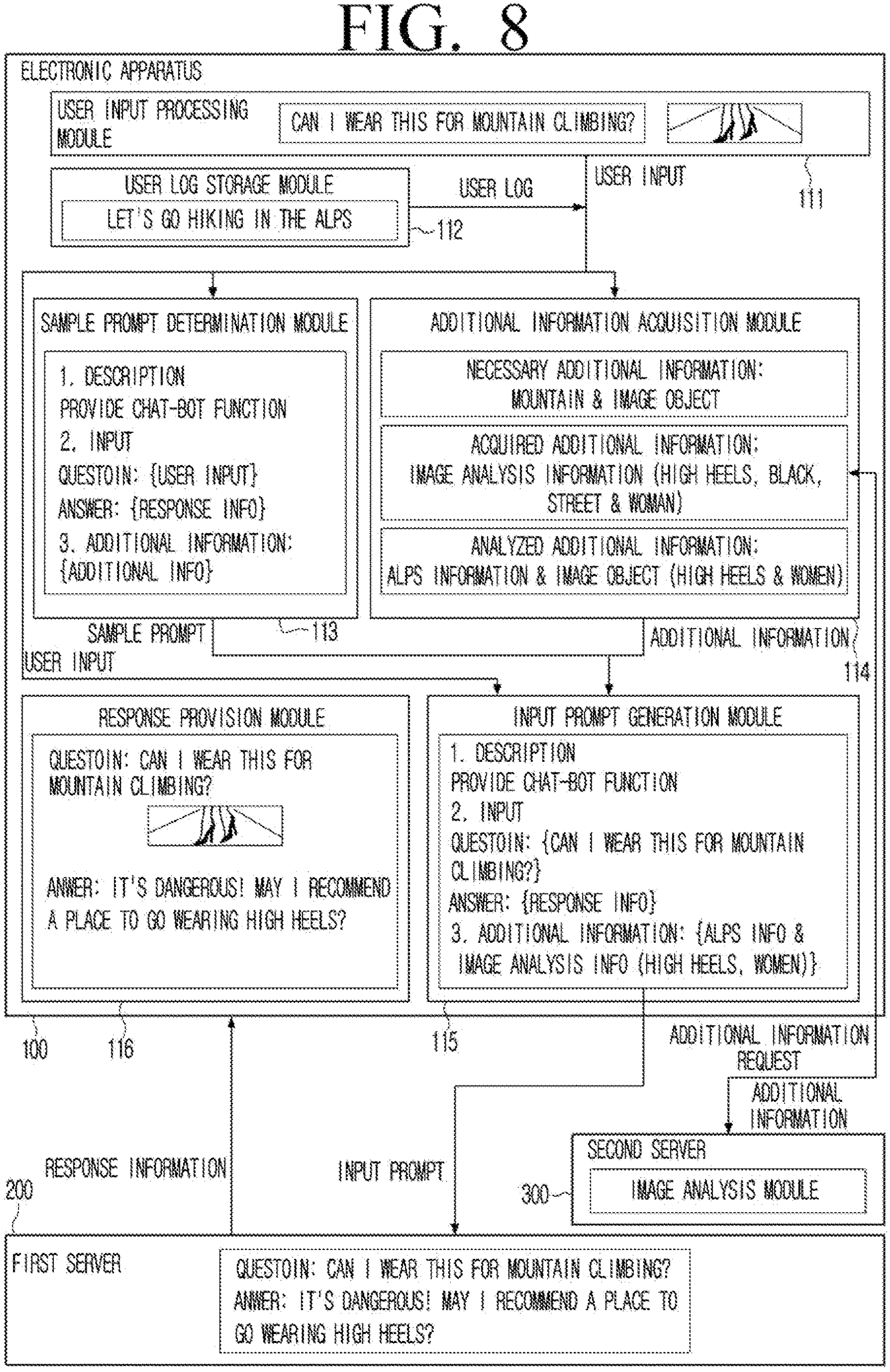
FIG. 8 is a view for explaining a process of providing response information according to an embodiment.

FIG. 8 is a view for explaining a process of providing response information according to various embodiments.

Referring to FIG. 8, the user input processing module 111 may receive user input ('Can I wear this for mountain climbing?' and 'image data'). The user input may include text information. Based on the user input being voice information, the user input processing module 111 may convert the voice information into the text information. In addition, the user input may include image data ('composition image').

The user input processing module 111 may transmit the user input ('Can I wear this for mountain climbing?' and 'image data') to at least one module of the sample prompt determination module 113, the additional information acquisition module 114, or input prompt generation module 115.

The user log storage module 112 may acquire a user log ('Let's go hiking in the Alps'). In addition, the user log storage module 112 may transmit the user log ('Let's go hiking in the Alps') to at least one of the sample prompt determination module 113, the additional information acquisition module 114, and the input prompt generation module 115.

The sample prompt determination module 113 may receive the user input ('Can I wear this for mountain climbing?' and 'image data') from the user input processing module 111. In addition, the sample prompt determination module 113 may receive the user log ('Let's go hiking in the Alps') from the user log storage module 112. The sample prompt determination module 113 may identify, determine, or select a sample prompt based on at least one of the user input ('Can I wear this for mountain climbing?' and 'image data') and the user log ('Let's go hiking in the Alps'). The sample prompt determination module 113 may transmit the determined sample prompt to the input prompt generation module 115.

The additional information acquisition module 114 may receive the user input ('Can I wear this for mountain climbing?' and 'image data') from the user input processing module 111. In addition, the additional information acquisition module 114 may receive the user log ('Let's go hiking in the Alps') from the user log storage module 112. The additional information acquisition module 114 may acquire additional information based on at least one of the user input ('Can I wear this for mountain climbing?' and 'image data') and the user log ('Let's go hiking in the Alps').

The additional information acquisition module 114 may determine necessary additional information to generate response information corresponding to the user input. The additional information acquisition module 114 may determine the necessary additional information ('mountain' and 'image object'). In addition, the additional information acquisition module 114 may request the necessary additional information from the second server 300. For example, the additional information acquisition module 114 may transmit a control signal requesting the additional information to the user log storage module 112. The control signal may include information for requesting the additional information and the necessary additional information ('mountain' and 'image object').

The second server 300 may acquire image analysis information ('high heels', 'black', 'street', and 'woman') based on the additional information request received from the additional information acquisition module 114. The second server 300 may acquire the necessary additional information ('mountain' and 'image object') from the received control signal. In addition, the second server 300 may transmit the information ('high heels', 'black', 'street', and 'woman') corresponding to the necessary additional information ('mountain' and 'image object') to the additional information acquisition module 114. The additional information acquisition module 114 may receive the information ('high heels', 'black', 'street', 'woman') from the second server 300. The received information ('high heels', 'black', 'street', 'woman') may be described as the acquired additional information.

According to various embodiments, the additional information acquisition module 114 may acquire final additional information ('high heels' and 'woman') by analyzing the data transmitted by the second server 300. In addition, the additional information acquisition module 114 may transmit the final additional information ('high heels' and 'woman') to the input prompt generation module 115. The additional information acquisition module 114 may select objects ('high heels' and 'woman') relevant to at least one of the user input and the user log from the plurality of objects ('high heels', 'black', 'street', and 'woman') included in the image. The additional information acquisition module 114 may determine the selected objects ('high heels' and 'woman') as the final additional information.

The input prompt generation module 115 may receive the user input ('Can I wear this for mountain climbing?' and 'image data') from the user input processing module 111. In addition, the input prompt generation module 115 may receive the user log ('Let's go hiking in the Alps') from the user log storage module 112. In addition, the input prompt generation module 115 may receive the determined sample prompt from the sample prompt determination module 113. In addition, the input prompt generation module 115 may receive the final additional information ('high heels' and 'woman') from the additional information acquisition module 114. The input prompt generation module 115 may generate an input prompt based on at least one of the user input ('Can I wear this for mountain climbing?' and 'image data'), the user log ('Let's go hiking in the Alps'), the determined sample prompt or the additional information ('high heels' and 'woman'). The input prompt generation module 115 may transmit the generated input prompt to the first server 200.

The first server 200 may receive the input prompt from the input prompt generation module 115. In addition, the first server 200 may generate response information based on the received input prompt. The first server 200 may transmit the generated response information to the response provision module 116. The first server 200 may acquire, from the input prompt, at least one of the user input ('Can I wear this for mountain climbing?' and 'image data'), the user log ('Let's go hiking in the Alps'), the determined sample prompt, and the additional information ('high heels' and 'woman'). In addition, the first server 200 may generate response information ('It's dangerous! May I recommend a place to go wearing high heels?') based on at least one of the user input ('Can I wear this for mountain climbing?' and 'image data'), the user log ('Let's go hiking in the Alps'), the determined sample prompt, and the additional information ('high heels' and 'woman').

The response provision module 116 may receive, from the first server 200, the response information ('It's dangerous! May I recommend a place to go wearing high heels?'). The response provision module 116 may provide the user with the response information ('It's dangerous! may I recommend a place to go wearing high heels?') received from the first server 200.

Figure 9:
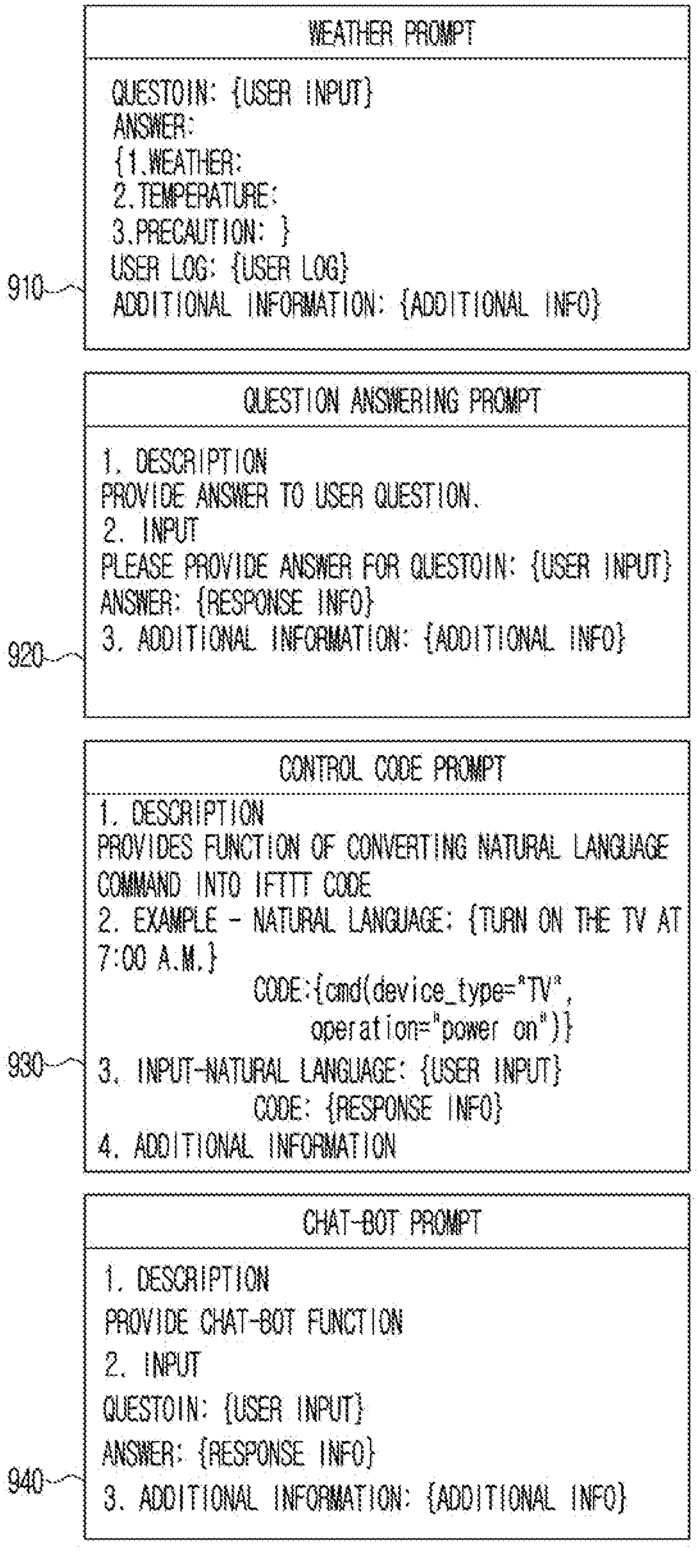
FIG. 9 is a view for explaining a plurality of sample prompts, according to an embodiment.

FIG. 9 is a view for explaining a plurality of sample prompts.

A sample prompt 910 in FIG. 9 may represent a weather prompt. The weather prompt may be a sample prompt selected based on user input related to weather being received. The sample prompt 910 may include answer structure information for an answer to weather, temperature, and precautions to be provided.

A sample prompt 920 in FIG. 9 may represent a question answering prompt. The question answering prompt may be a sample prompt selected based on user input related to the question being received. The sample prompt 920 may include description information and answer structure information that are related to the question answering.

A sample prompt 930 in FIG. 9 may represent a control code prompt. The control code prompt may be a sample prompt selected based on user input related to the device control being received. The sample prompt 930 may include description information and answer structure information that are related to device control.

A sample prompt 940 in FIG. 9 may represent a chat-bot prompt. The chat-bot prompt may be a sample prompt selected based on user input related to a chat-bot function being received. The sample prompt 940 may include description information and answer structure information that are related to a chat-bot service.

FIG. 10 is a view for explaining a category of the sample prompt.

Referring to a table 1010 of FIG. 10, the plurality of sample prompts may be assigned to one category. For example, the categories of the sample prompt may be weather, question answering, control code, and chat-bot.

According to various embodiments, one sample prompt may exist in one category. For example, a sample prompt of #02 may exist in the question answering category.

According to various embodiments, a plurality of sample prompts may exist in one category. For example, sample prompts of #01-1, #01-2, and #01-3 may exist in the weather category. Each sample prompt may have a different answer structure. The sample prompt of #01-1 may provide only weather as the response information. The sample prompt of #01-2 may provide weather and temperature as the response information. The sample prompt of #01-3 may provide weather, temperature and humidity as the response information.

As another example, sample prompts of #04-1, #04-2, and #04-3 may exist in the chatbot category. Each sample prompt may have a different answer structure. The sample prompt of #01-1 may provide only text as the response information. The sample prompt of #04-2 may provide text and emoji as the response information. The sample prompt of #04-3 may provide control text, emoji, and another application as the response information.

FIG. 11 is a view for explaining an operation of the task determination module according to various embodiments.

Referring to an embodiment 1110 of FIG. 11, the task determination module 113-2 may determine that a user input corresponds to a chat-bot task based on receiving the user input ('It is really hot today'). The sample prompt determination module 113 may select the chat-bot prompt from the plurality of sample prompts.

Referring to an embodiment 1120 of FIG. 11, the task determination module 113-2 may determine that user input corresponds to the question answering task based on receiving the user input ('What temperature is it now?') and user logs ('It is really hot today' and 'It really is'). The sample prompt determination module 113 may select the weather prompt from the plurality of sample prompts.

Referring to an embodiment 1130 of FIG. 11, the task determination module 113-2 may determine that user input corresponds to the device control task based on receiving the user input ('Turn on the air conditioner?') and user logs ('It is really hot today', 'It really is', 'What temperature is it now?', and 'The temperature in Seoul is 33 degrees' now). The sample prompt determination module 113 may select the control code prompt from the plurality of sample prompts.

Figure 12:
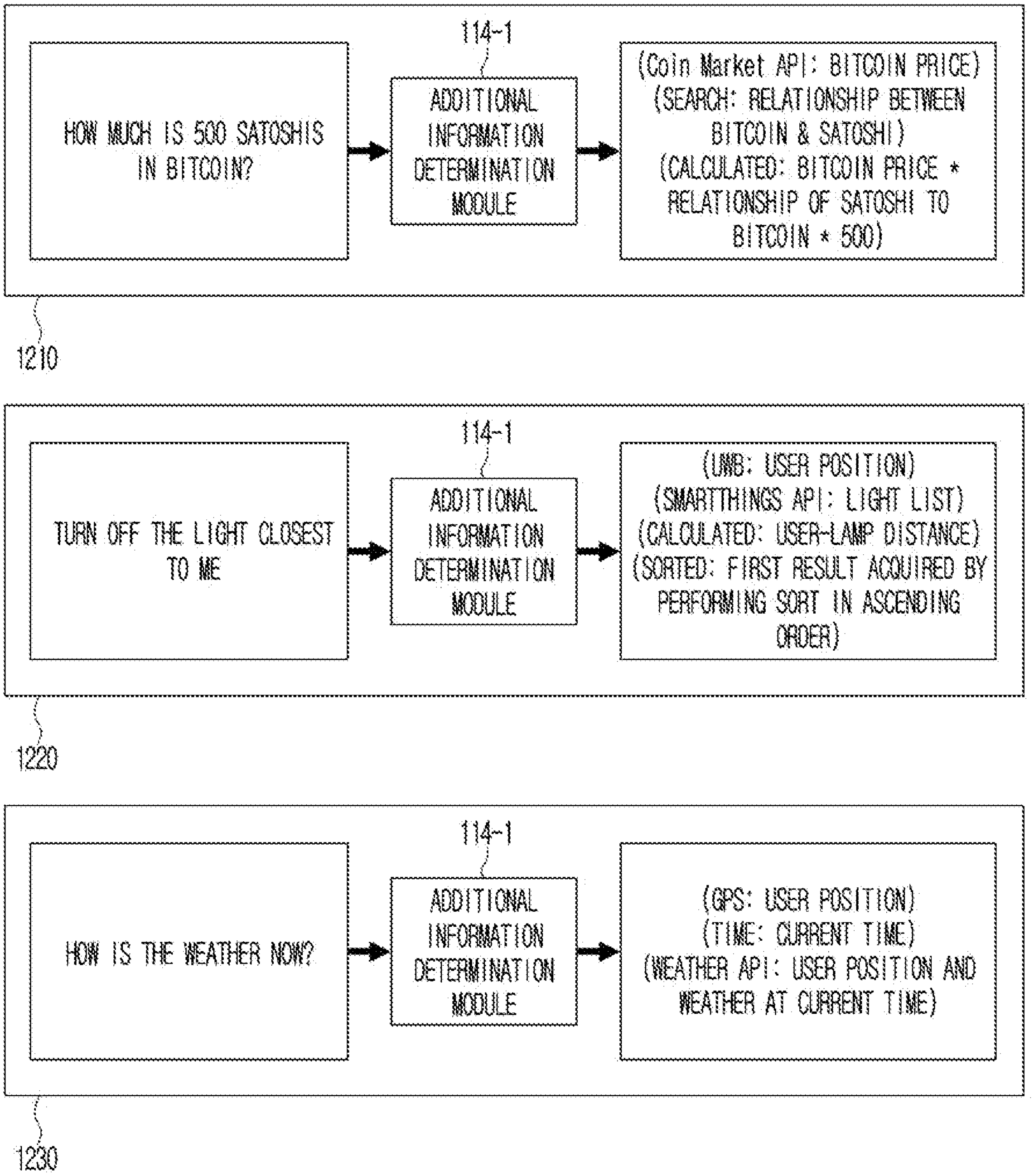
FIG. 12 is a view for explaining an operation of an additional information determination module according to an embodiment.

FIG. 12 is a view for explaining an operation of the additional information determination module 114-1 according to various embodiments.

Referring to an embodiment 1210 of FIG. 12, based on receiving the user input ('How much is 500 bitcoins?'), the additional information determination module 114-1 may determine, as necessary additional information, the bitcoin price ('coin market API', 'Application Program Interface'), the relationship between bitcoin and satoshi (i.e., search term to be used in a search engine) and the bitcoin price*relationship between bitcoin and satoshi*500 ('calculation formula').

Referring to an embodiment 1220 of FIG. 12, based on receiving user input ('Turn off the closest light to me'), the additional information determination module 114-1 may determine, as necessary additional information, a user position ('ultra wide band (UWB)'), a light list ('SmartThings API'), a distance between the user and the light ('calculation formula'), and a sorting method ('first result acquired by performing sort in ascending order').

Referring to an embodiment 1230 of FIG. 12, based on receiving user input ('How is the weather now?'), the additional information determination module 114-1 may determine, as necessary additional information, a user position ('global positioning system (GPS)'), current time, weather at the user position and the current time ('Weather API').

Figure 13:
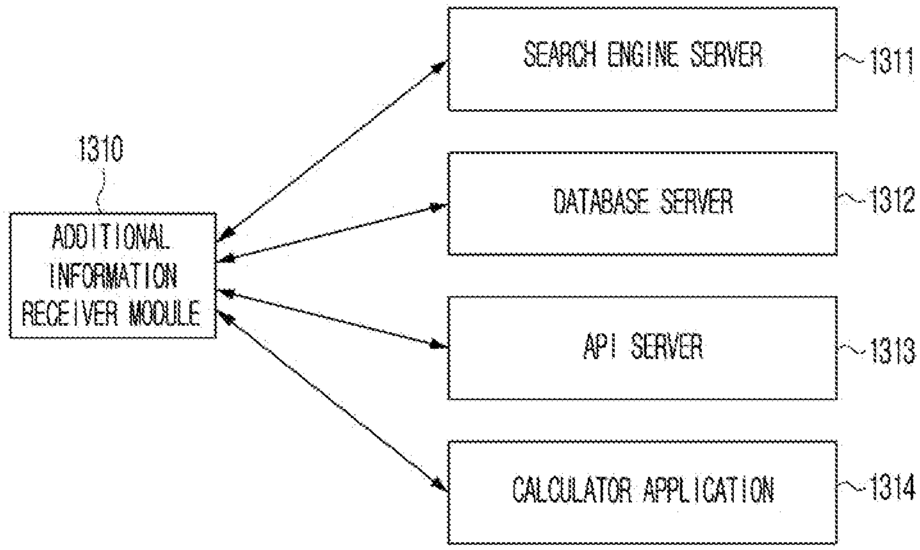
FIG. 13 is a view for explaining an operation of an additional information receiver module according to an embodiment.

FIG. 13 is a view for explaining an operation of the additional information receiver module according to various embodiments.

Referring to FIG. 13, the additional information receiver module 1310 may acquire the additional information based on at least one of a search engine server 1311, a database server 1312, an application programming interface (API) server 1313, and a calculator application 1314. In embodiments, the additional information receiver module 1310 may correspond to the additional information receiver module 114-2 discussed above.

The additional information receiver module 1310 may request the additional information from an external server or an external application. In addition, the additional information receiver module 1310 may receive the additional information from the external server or the external application.

The search engine server 1311 may acquire a search result based on a keyword transmitted by the additional information receiver module 1310. The search engine server 1311 may transmit the search result to the additional information receiver module 1310.

The database server 1312 may acquire data corresponding to the additional information request transmitted by the additional information receiver module 1310. The database server 1312 may transmit the acquired data to the additional information receiver module 1310.

The API server 1313 may acquire data corresponding to API information transmitted by the additional information receiver module 1310. The API server 1313 may transmit the acquired data to the additional information receiver module 1310.

The calculator application 1314 may acquire a calculation result corresponding to calculation formula information transmitted by the additional information receiver module

1310. The calculator application 1314 may transmit the calculation results to the additional information receiver module 1310.

Figure 14:
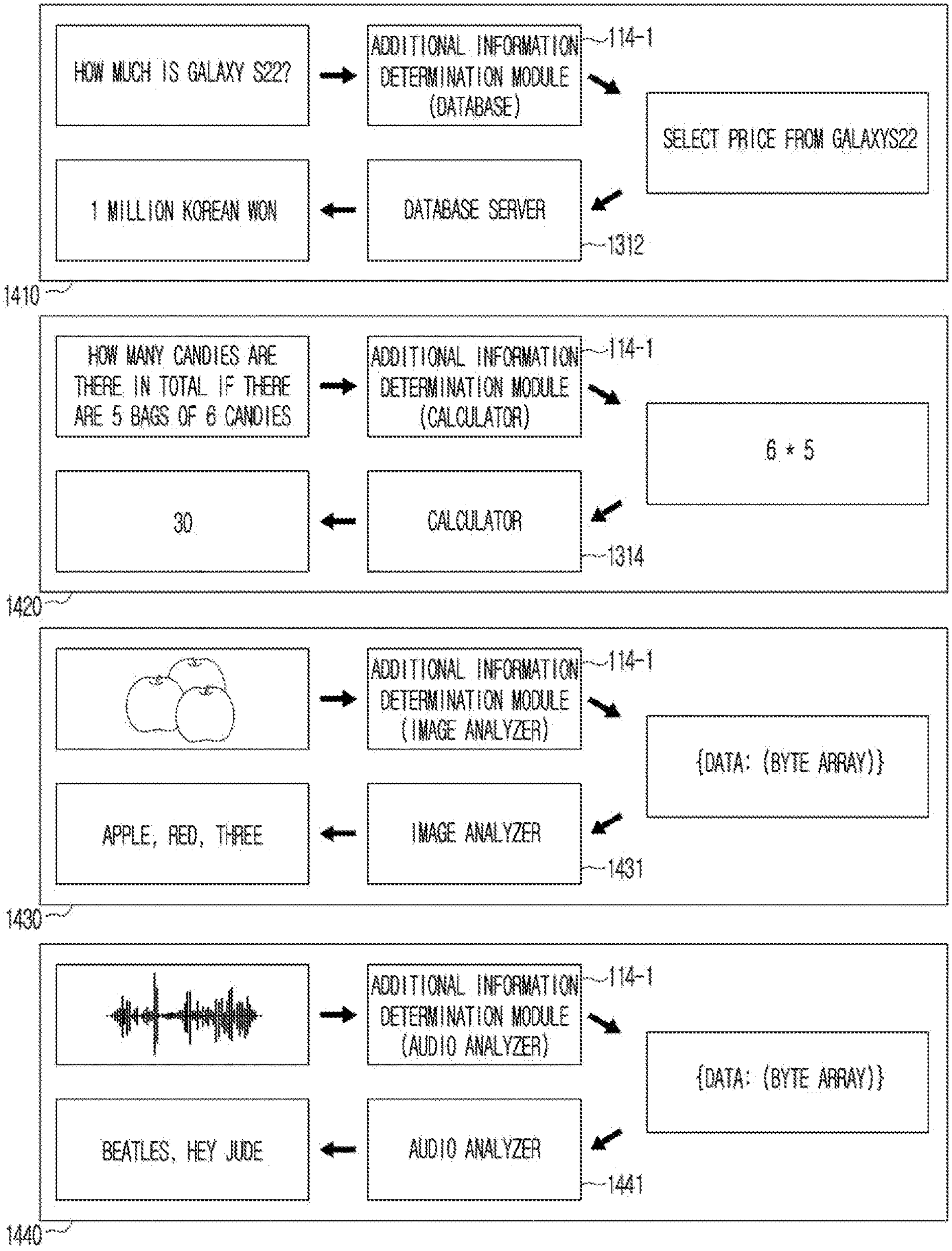
FIG. 14 is a view for explaining an operation of an additional information determination module according to an embodiment.

FIG. 14 is a view for explaining an operation of the additional information determination module according to various embodiments.

Referring to an embodiment 1410 of FIG. 14, based on receiving user input ('How much is Galaxy S22?'), the additional information determination module 114-1 may acquire requested information ('SELECT Price FROM GalaxyS22') corresponding to the user input. The requested information may indicate necessary additional information. The additional information determination module may transmit the requested information to the database server. The additional information determination module 114-1 may acquire additional information ('1 million Korean won') from the database server 1312.

Referring to an embodiment 1420 of FIG. 14, based on receiving user input ('How many candies are there in total if there are 5 bags of 6 candies?'), the additional information determination module 114-1 may acquire requested information ('6*5') corresponding to the user input. The additional information determination module 114-1 may transmit the requested information to the calculator application. The additional information determination module 114-1 may acquire additional information ('30') from the calculator application 1314.

Referring to an embodiment 1430 of FIG. 14, based on receiving user input ('image data'), the additional information determination module 114-1 may acquire requested information ('data representing the image') corresponding to the user input. The additional information determination module 114-1 may transmit the requested information to an image analyzer application 1431. The additional information determination module 114-1 may acquire additional information ('apple object, red object, and number (3) of apple objects') from the image analyzer application 1431.

Referring to an embodiment 1440 of FIG. 14, based on receiving user input ('audio data: music'), the additional information determination module 114-1 may acquire requested information ('data representing audio') corresponding to the user input. The additional information determination module 114-1 may transmit the requested information to an audio analyzer application 1441. The additional information determination module 114-1 may acquire additional information ('music information: Hey Jude, Beatles') from the audio analyzer application 1441.

Figure 15:
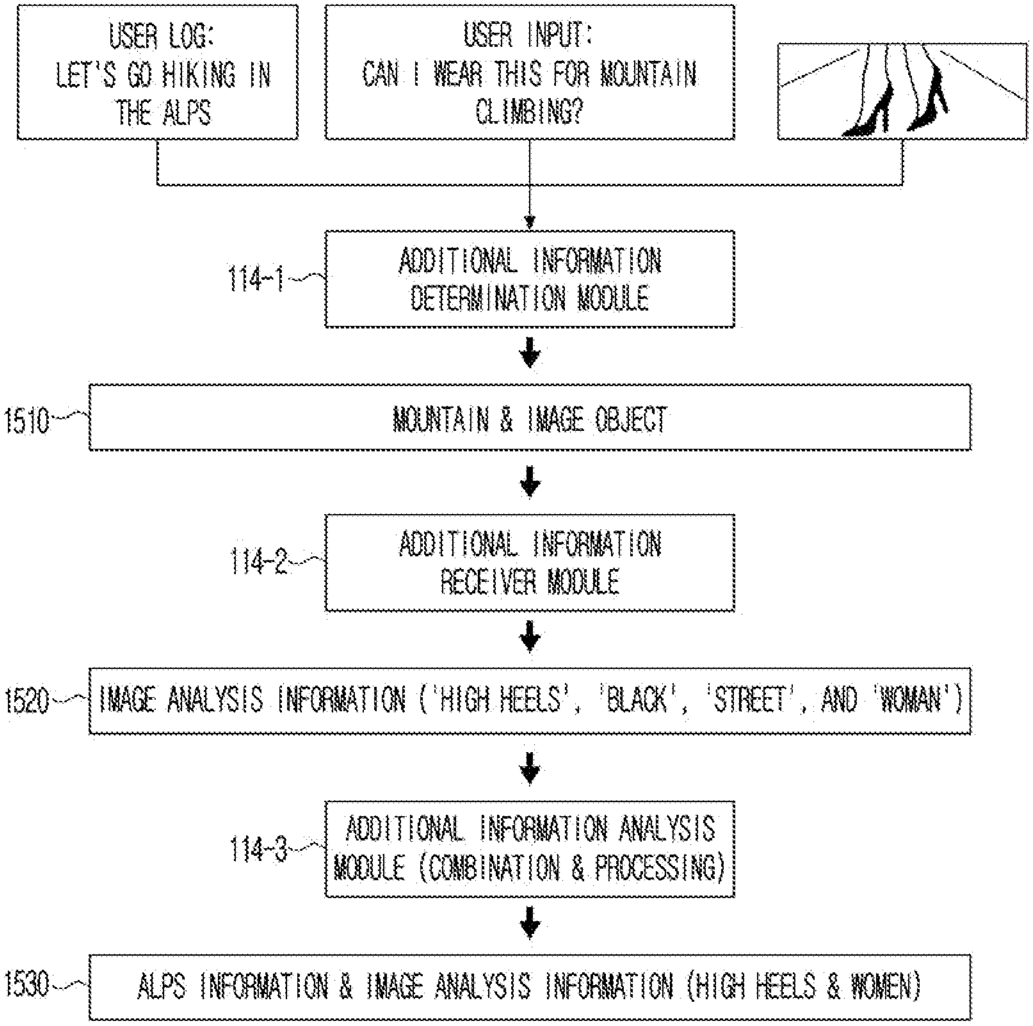
FIG. 15 is a view for explaining an operation of acquiring additional information.

FIG. 15 is a view for explaining an operation of acquiring the additional information.

Referring to FIG. 15, based on receiving the user input ('Can I wear this for mountain climbing?'), the user log ('Let's go hiking in the Alps'), and an image data ('shoe image'), the additional information determination module 114-1 may acquire requested information 1510. The requested information 1510 may include mountain and image objects.

An additional information receiver module 114-2 may acquire additional information 1520 based on the requested information 1510. The additional information 1520 may include image analysis information (high heels object, black object, street object, and woman object).

An additional information analysis module 114-3 may analyze the received additional information 1520 and the user log. The additional information analysis module 114-3 may acquire, as final additional information 1530, the additional information (for example high heels object and woman object) related to the user input or the user log, which is an analysis result. The additional information analysis module 114-3 may acquire Alps information as the final additional information 1530 based on the user log ('Let's go hiking in the Alps').

Figure 16:
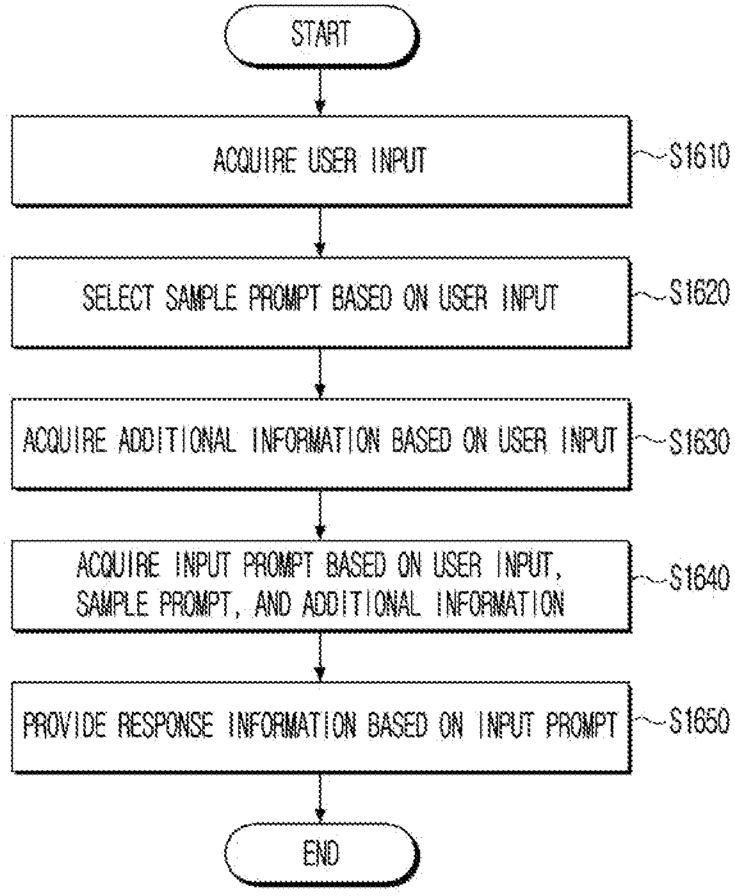
FIG. 16 is a view for explaining an operation of an additional information determination module according to an embodiment.

FIG. 16 is a view for explaining an operation of the additional information determination module according to various embodiments.

Referring to FIG. 16, the electronic apparatus 100 may acquire user input at operation S1610. The user input may be at least one of text information, image information, and audio information. The text information may be acquired through a keyboard. In addition, the electronic apparatus 100 may acquire the text information using text recognition technology in the image information (e.g., optical character reader (OCR)). In addition, the electronic apparatus 100 may acquire the text information using text recognition technology in audio information (e.g., voice recognition function). The voice recognition function may be a function of converting an audio signal into the text information.

The electronic apparatus 100 may select a sample prompt based on the user input at operation S1620. The prompt may be sample data of input data used to provide response information. The prompt may include various information used to generate the response information. The prompt may include structure information of a response corresponding to the user input. The electronic apparatus 100 may generate the response information based on the structure information included in the prompt.

The electronic apparatus 100 may acquire additional information based on the user input at operation S1630. The electronic apparatus 100 may acquire the additional information related to the user input. The electronic apparatus 100 may acquire various information related to a word included in the user input.

The electronic apparatus 100 may acquire an input prompt based on the user input, the sample prompt, and the additional information at operation S1640. The electronic apparatus 100 may generate the input prompt by adding the user input and the additional information to the sample prompt.

The electronic apparatus 100 may provide the response information based on the input prompt at operation S1650. The electronic apparatus 100 may acquire the user input, the sample prompt, and the additional information, included in the input prompt. The electronic apparatus 100 may acquire the response information based on the user input, the sample prompt, and the additional information. The electronic apparatus 100 may provide the user with the acquired response information.

Although FIG. 16 shows that the operation S1630 being performed after the operation S1620, embodiments are not limited thereto. For example, according to various embodiments, the electronic apparatus 100 may first perform the operation S1630 and then perform the operation S1620. In addition, according to various embodiments, the electronic apparatus 100 may simultaneously perform operations S1620 and S1630. The description of the order of the operation of selecting the sample prompt and the operation of acquiring the additional information may be similarly applied to the following drawings.

Figure 17:
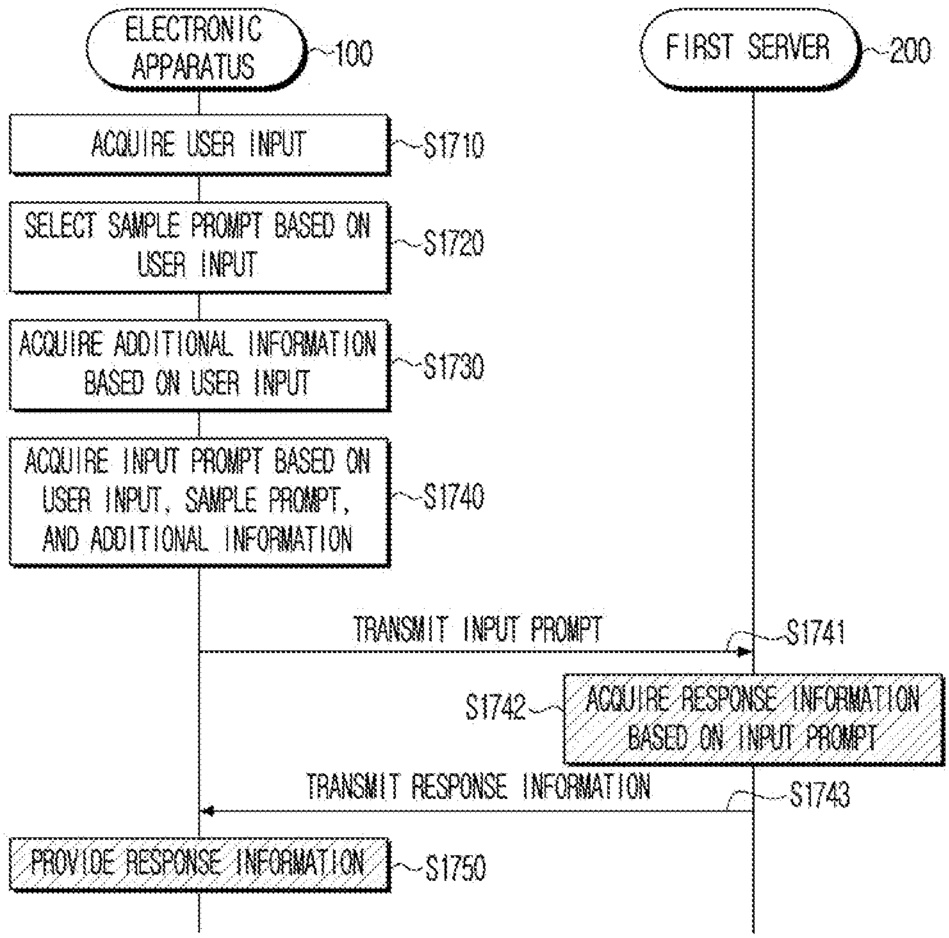
FIG. 17 is a flowchart for explaining an operation of acquiring the response information, according to an embodiment.

FIG. 17 is a flowchart for explaining an operation of acquiring the response information.

Operations S1710, S1720, S1730, S1740, and S1750 of FIG. 17 may correspond to the operations S1610, S1620, S1630, S1640, and S1650 of FIG. 16. The description thus may omit redundant descriptions thereof.

After acquiring an input prompt, the electronic apparatus 100 may transmit the input prompt to the first server 200 at operation S1741. The first server 200 may acquire the response information based on the input prompt received from the electronic apparatus 100 at operation S1742. In addition, the first server 200 may transmit the response information to the electronic apparatus 100 at operation S1743.

The electronic apparatus 100 may receive the response information from the first server 200. In addition, the electronic apparatus 100 may provide the user with the response information at operation S1750. According to various embodiments, the electronic apparatus 100 may display the response information on the display 140. According to various embodiments, the electronic apparatus 100 may output the response information through the speaker 170.

Figure 18:
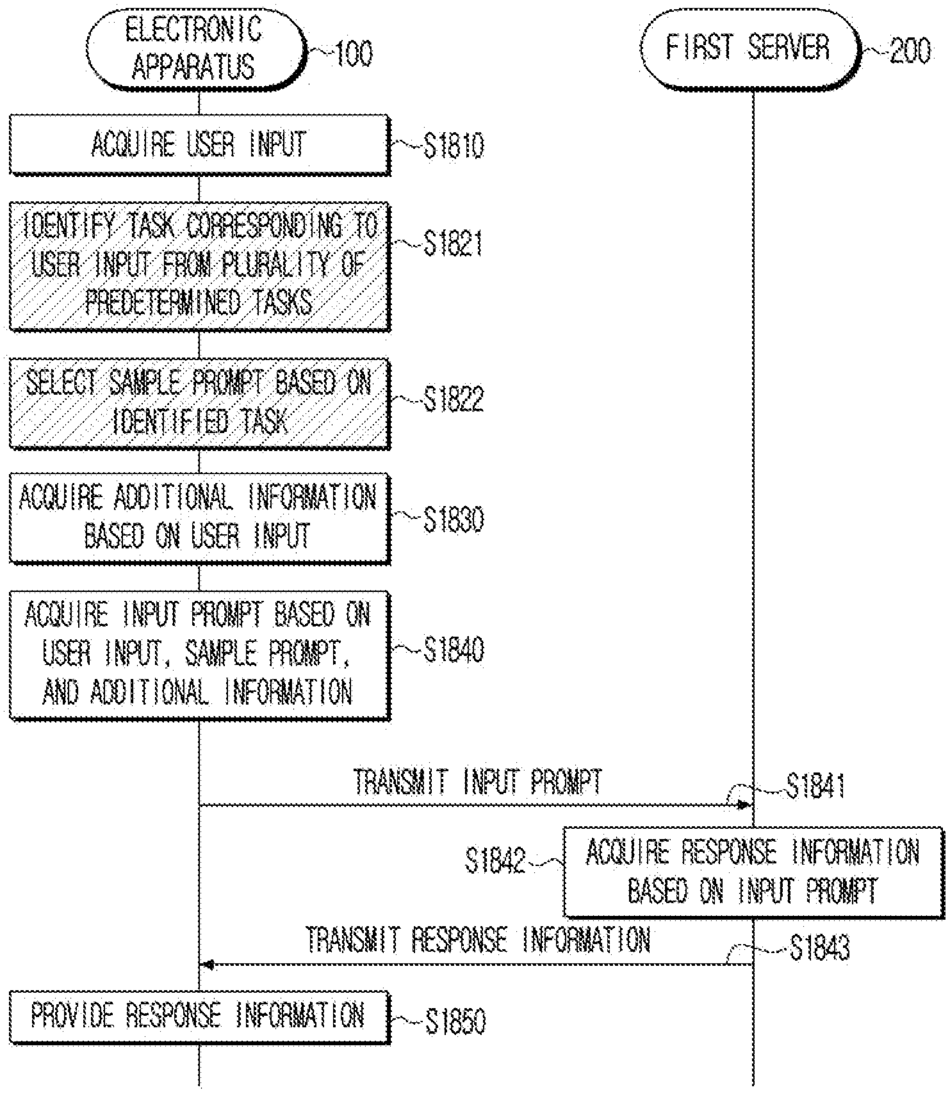
FIG. 18 is a flowchart for explaining an operation of acquiring the response information using a server, according to an embodiment.

FIG. 18 is a flowchart for explaining an operation of acquiring the response information using a server 200.

Operations S1810, S1830, S1840, S1841, S1842, S1843, and S1850 of FIG. 18 may correspond to the operations S1710, S1730, S1740, S1741, S1742, S1743, and S1750 of FIG. 17. The description thus may omit redundant descriptions thereof.

After acquiring the user input, the electronic apparatus 100 may identify a task corresponding to the user input from the plurality of predetermined tasks at operation S1821. An example of an operation related to this configuration is provided above with reference to FIG. 11.

In addition, the electronic apparatus 100 may select a sample prompt based on the identified task at operation S1822. The electronic apparatus 100 may select the sample prompt corresponding to the identified task from the plurality of sample prompts stored in the memory 110. The electronic apparatus 100 may then perform the operations S1830 to S1850.

Figure 19:
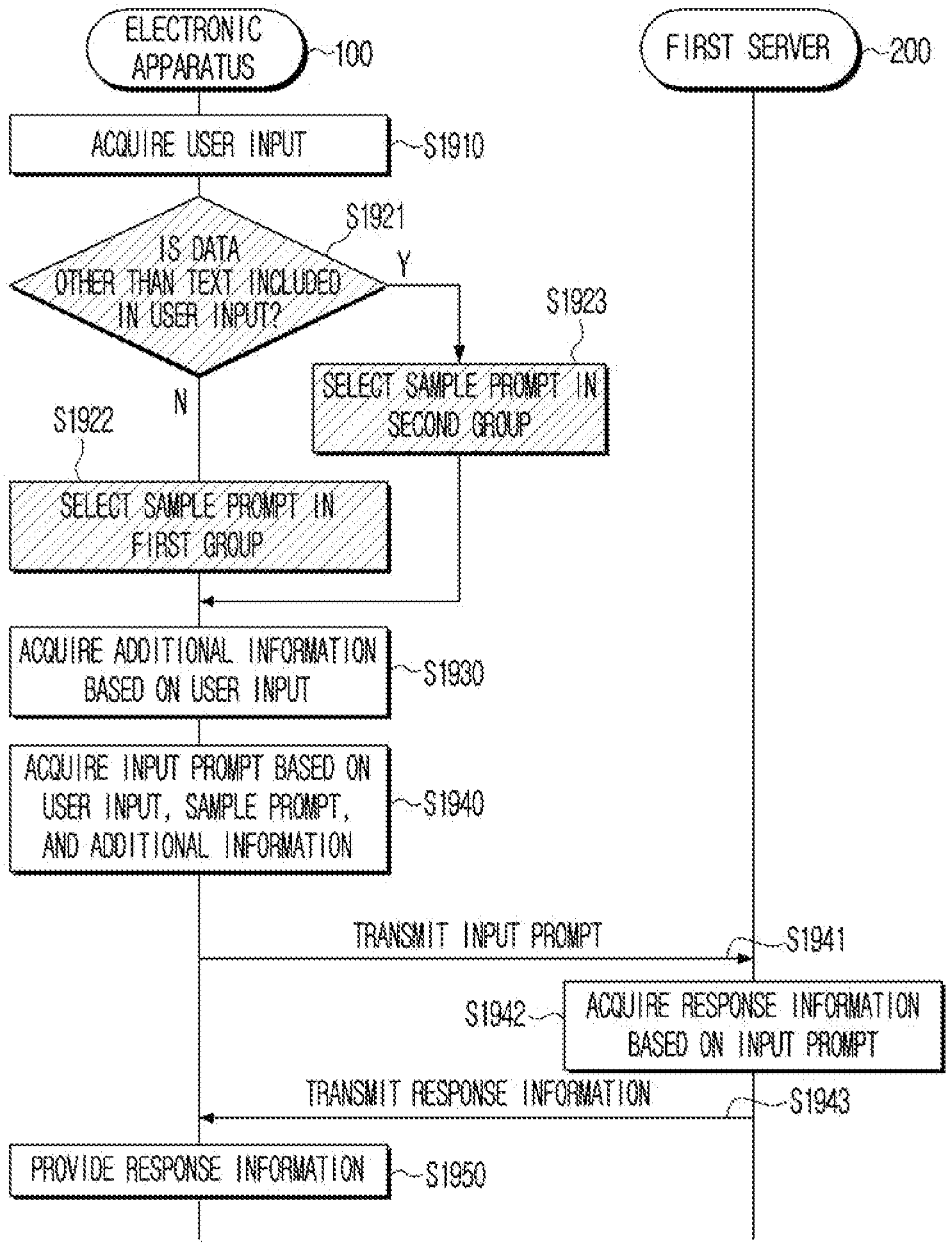
FIG. 19 is a flowchart for explaining an embodiment where the sample prompts are divided into separate groups, according to an embodiment.

FIG. 19 is a flowchart for explaining an embodiment where the sample prompts are divided into separate groups.

Operations S1910, S1930, S1940, S1941, S1942, S1943, and S1950 of FIG. 19 may correspond to the operations S1710, S1730, S1740, S1741, S1742, S1743, and S1750 of FIG. 17. The description thus may omit redundant descriptions thereof.

After acquiring the user input, the electronic apparatus 100 may determine whether data other than text is included in the user input at operation S1921. The data other than the text may indicate image data or audio data. The user input may include the image data or the audio data other than the text data. The electronic apparatus 100 may provide response information corresponding to the user input including the image data or the audio data.

The electronic apparatus 100 may distinguish and process user input including only the text data and user input including the image data or the audio data. The electronic apparatus 100 may store, as a first group, a sample prompt corresponding to the user input including only the text data. The first group may include a plurality of sample prompts, and the sample prompts included in the first group may be prompts for processing the user input including only the text data. The electronic apparatus 100 may store, as a second group, a sample prompt corresponding to the user input including the image data or the audio data. The second group may include a plurality of sample prompts, and the sample prompts included in the second group may be prompts for processing the user input including the image data or the audio data.

Based on the user input not including any data other than the text (N at operation S1921), the electronic apparatus 100 may select a sample prompt corresponding to the user input from the plurality of sample prompts stored in the first group at operation S1922. Based on only the text data being included in the user input, the electronic apparatus 100 may select the sample prompt from the first group.

Based on the user input including the data other than the text (Y at operation S1921), the electronic apparatus 100 may select a sample prompt corresponding to the user input from the plurality of sample prompts stored in the second group at operation S1923. Based on the image data or the image data being included in the user input, the electronic apparatus 100 may select the sample prompt from the second group. The electronic apparatus 100 may then perform the operations S1930 to S1950.

Figure 20:
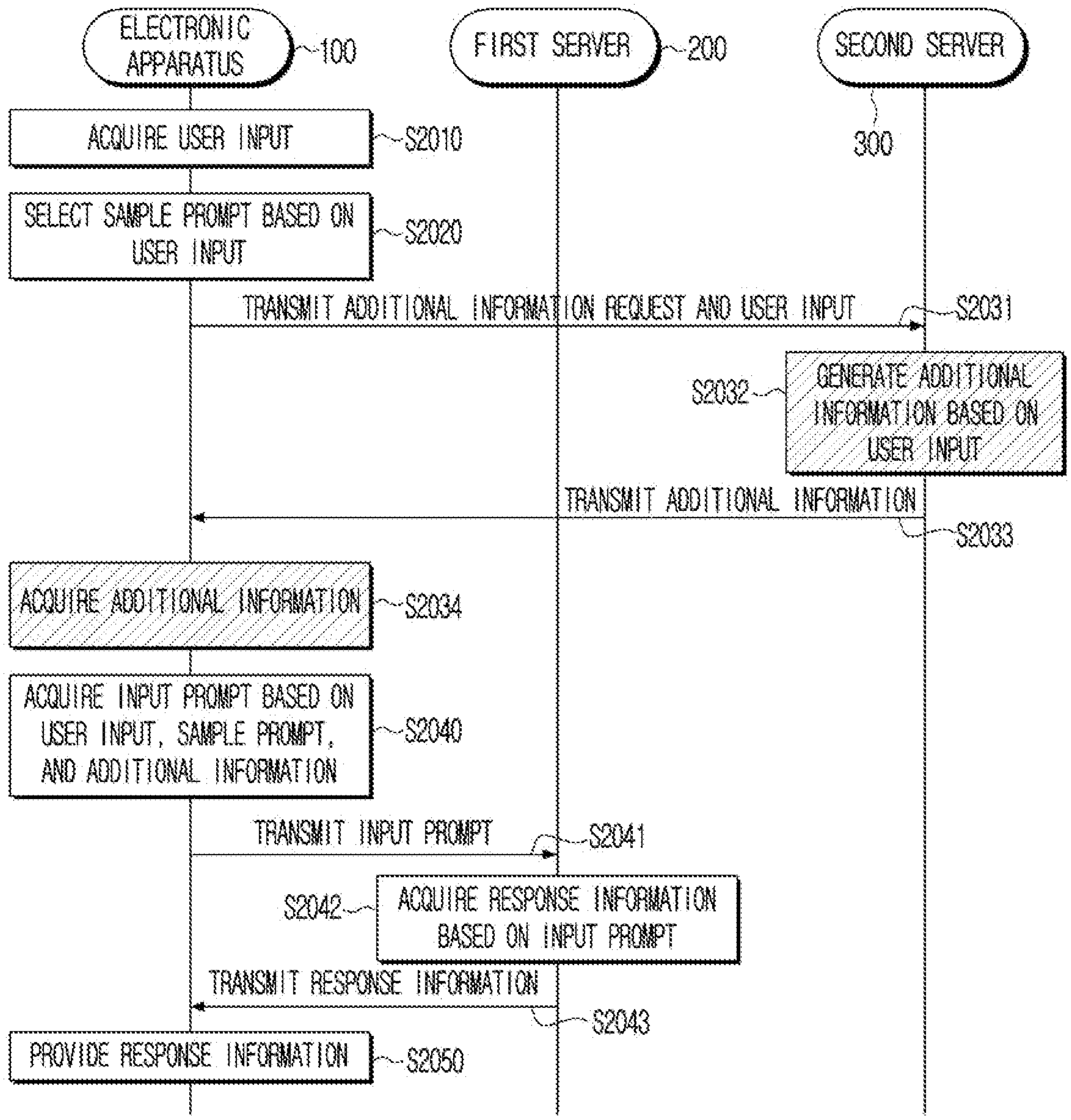
FIG. 20 is a flowchart for explaining an operation of acquiring the additional information using a second server, according to an embodiment.

FIG. 20 is a flowchart for explaining an operation of acquiring the additional information using a second server 300.

Operations S2010, S2020, S2040, S2041, S2042, S2043, and S2050 of FIG. 20 may correspond to the operations S1710, S1720, S1730, S1740, S1741, S1742, S1743, and S1750 of FIG. 17. The description thus may omit redundant descriptions thereof.

After acquiring the user input, the electronic apparatus 100 may transmit the additional information request and the user input to the second server 300 at operation S2031. The electronic apparatus 100 may generate a control signal including information requesting the additional information and the user input. In addition, the electronic apparatus 100 may transmit the generated control signal to the second server 300.

The second server 300 may receive the additional information request and the user input from the electronic apparatus 100. In addition, the second server 300 may generate additional information based on the user input at operation S2032. In addition, the second server 300 may transmit the generated additional information to the electronic apparatus 100 at operation S2033.

The electronic apparatus 100 may acquire or receive the additional information from the second server 300 at operation S2034. The electronic apparatus 100 may then perform the operations S2040 to S2050.

Figure 21:
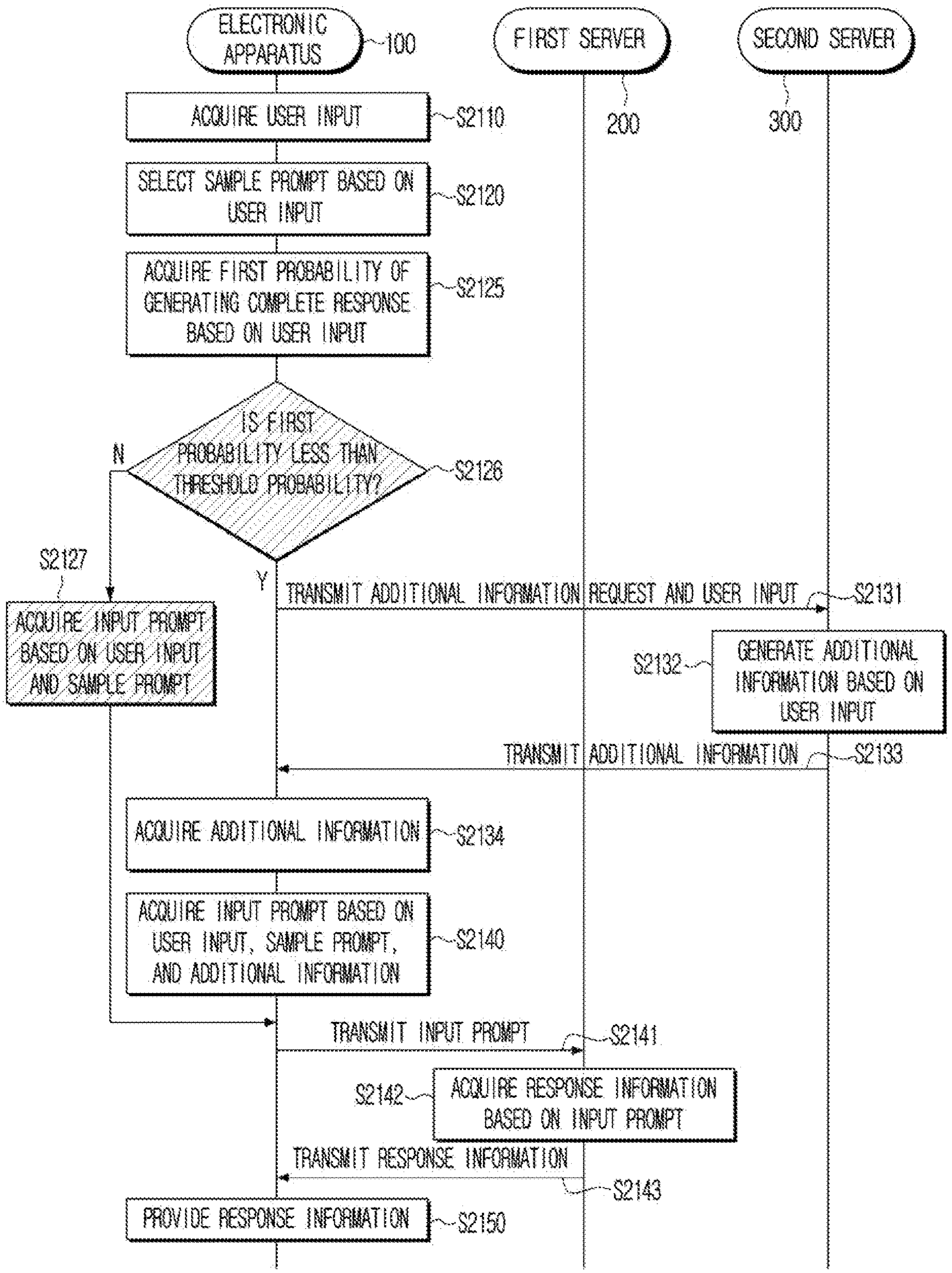
FIG. 21 is a flowchart for explaining an operation of acquiring an input prompt based on a probability of generating a complete response, according to an embodiment.

FIG. 21 is a flowchart for explaining an operation of acquiring an input prompt based on a probability of generating a complete response.

Operations S2110, S2120, S2131, S2132, S2133, S2134, S2140, S2141, S2142, S2143, and S2150 of FIG. 21 may correspond to the operations S2010, S2020, S2031, S2032, S2033, S2034, S2040, S2041, S2042, S2043, and S2050 of FIG. 20. The description thus may omit redundant descriptions thereof.

After acquiring the user input, the electronic apparatus 100 may acquire a first probability of generating a complete response based on the user input at operation S2125. The complete response may indicate a response which may accurately deliver information corresponding to the user input. The electronic apparatus 100 may acquire or calculate the first probability indicating a possibility of generating the complete response based on the user input.

The electronic apparatus 100 may determine whether the first probability is less than a threshold probability or a predetermined probability at operation S2126. Based on the first probability being less than the threshold probability (Y at operation S2126), the electronic apparatus 100 may request the additional information from the second server 300. Based on the first probability being less than the threshold probability, the electronic apparatus 100 may determine that the additional information is necessary. The electronic apparatus 100 may then perform the operations S2131 to S2140.

Based on the first probability being not less than the threshold probability (N at operation S2126), the electronic apparatus 100 may acquire an input prompt based on the user input and the sample prompt at operation S2127. Based on the first probability being not less than the threshold probability, the electronic apparatus 100 may generate the input prompt based on only the user input and the sample prompt without separately acquiring the additional information.

The electronic apparatus 100 may then perform the operations S2141 to S2150.

Figure 22:
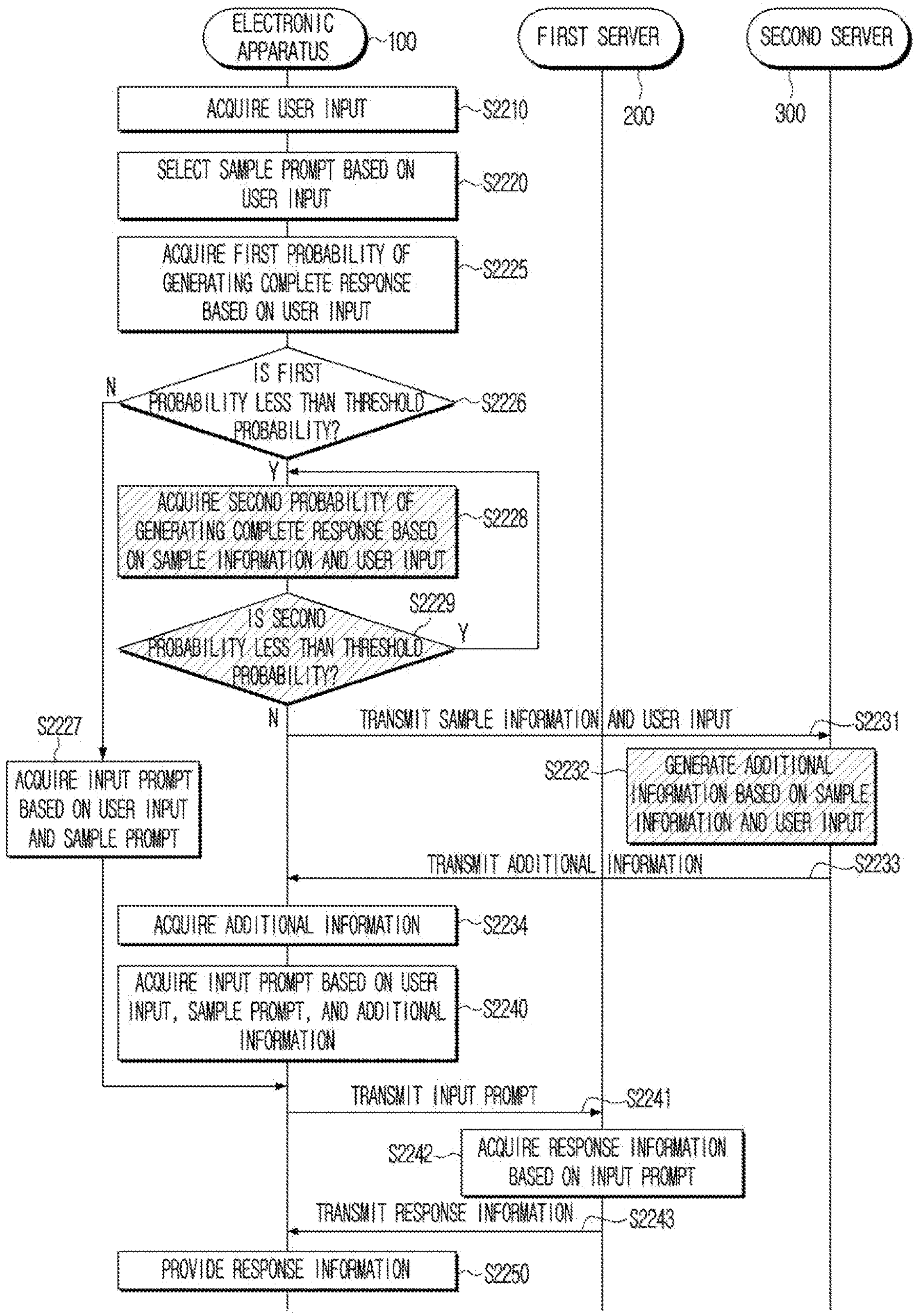
FIG. 22 is a flowchart for explaining an operation of determining the additional information based on the probability of generating the complete response, according to an embodiment.

FIG. 22 is a flowchart for explaining an operation of determining the additional information based on the probability of generating the complete response.

Operations S2210, S2220, S2225, S2226, S2227, S2233, S2234, S2240, S2241, S2242, S2243, and S2250 of FIG. 22 may correspond to the operations S2110, S2120, S2125, S2126, S2127, S2133, S2134, S2140, S2141, S2142, S2143, and S2150 of FIG. 21. The description thus may omit redundant descriptions thereof.

Based on the first probability being determined or identified as less than the threshold probability (Y at operation S2226), the electronic apparatus 100 may acquire a second probability of generating the complete response based on sample additional information and the user input at operation S2228. The sample additional information may be described as dummy information or arbitrary information. The electronic apparatus 100 may arbitrarily select any sample additional information from the plurality of pieces of sample additional information stored in the memory 110. The electronic apparatus 100 may acquire the second probability of generating the complete response based on the selected sample additional information and the user input.

According to various embodiments, the electronic apparatus 100 may identify a keyword included in the user input and select sample additional information related to the identified keyword. Based on the plurality of pieces of sample additional information related to the keyword existing, the electronic apparatus 100 may select the sample additional information in order of relevance. The description provides an additional description of an example of the sample additional information below with reference to FIG. 23.

The first probability acquired in the step S2225 may be the probability of generating the complete response based on only the user input, and the second probability acquired in the step S2228 may be the probability of generating the complete response based on the user input and the selected sample additional information.

The electronic apparatus 100 may determine whether the second probability is less than a threshold probability at operation S2229. According to various embodiments, the threshold probability of the step S2226 and the threshold probability of the step S2229 may be the same as each other. According to various embodiments, the threshold probability of the step S2226 and the threshold probability of the step S2229 may be different from each other. In this case, each threshold probability may be described as a first threshold probability or a second threshold probability.

Based on the second probability being less than the threshold probability (Y at operation S2229), the electronic apparatus 100 may re-acquire the second probability of generating the complete response based on new sample additional information and the user input. The electronic apparatus 100 may repeat the operations S2228 to S2229 until the second probability is greater than or equal to the threshold probability.

Based on the second probability being not less than the threshold probability (N at operation S2229), the electronic apparatus 100 may transmit the sample additional information and the user input to the second server 300 at operation S2231. The electronic apparatus 100 may request additional information corresponding to the sample additional information from the second server 300. The electronic apparatus 100 may determine whether which information is necessary to generate the complete response using the sample additional information. Therefore, the electronic apparatus 100 may acquire the same type of information as the sample additional information based on the current time point.

The second server 300 may acquire the additional information based on the sample additional information and the user input received from the electronic apparatus 100 at operation S2232. In addition, the second server 300 may transmit the additional information to the electronic apparatus 100.

The electronic apparatus 100 may acquire the additional information from the second server 300 at operation S2234. The electronic apparatus 100 may acquire an input prompt based on the user input, the sample prompt, and the additional information at operation S2240.

The electronic apparatus 100 may then perform the operations S2241 to S2250.

Figure 23:
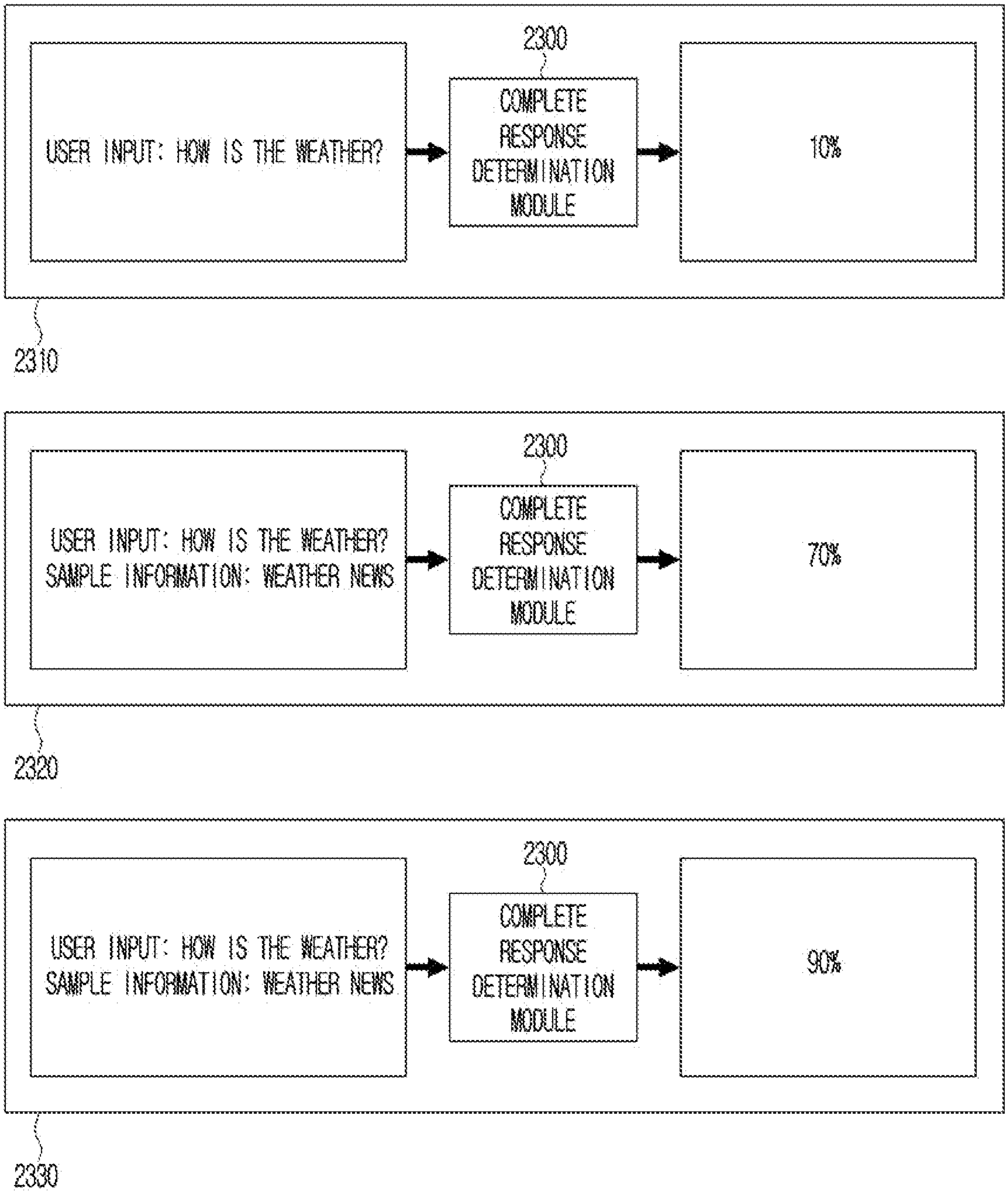
FIG. 23 is a view for explaining an operation of a complete response determination module according to an embodiment.

FIG. 23 is a view for explaining an operation of the complete response determination module according to various embodiments.

Referring to an embodiment 2310 of FIG. 23, the complete response determination module 2300 may calculate the first probability as 10% based on receiving user input ('How is the weather?').

Referring to an embodiment 2320 of FIG. 23, the complete response determination module 2300 may calculate the second probability as 70% based on receiving the user input ('How is the weather?') and selecting sample additional information ('weather news'). For example, 80% may be the threshold probability related to the second probability. The electronic apparatus 100 may determine that it is difficult to generate the complete response based on only the user input ('How is the weather?') and the sample additional information ('weather news'). The electronic apparatus 100 may select the new sample additional information.

Referring to an embodiment 2330 of FIG. 23, the complete response determination module 2300 may calculate the second probability as 90% based on receiving the user input ('How is the weather?') and selecting the sample additional information ('weather news'). For example, 80% may be the threshold probability related to the second probability. The electronic apparatus 100 may determine that the complete response may be generated based on the user input ('How is the weather?') and the sample additional information ('weather data').

In embodiments, the sample additional information mentioned in the embodiments 2320 and 2330 may not be data of a time point at which the user input is received, and instead may be data of a past time point based on the time point at which the user input is received. The sample additional information may be information which is only used to determine the probability of generating the complete response as the word itself indicates, and may not be information used to actually generate the response information.

Therefore, the electronic apparatus 100 may request the additional information even though the second probability acquired based on the user input and the sample additional information is greater than or equal to the threshold probability. The electronic apparatus 100 may determine which additional information to request based on the sample additional information. The possibility of generating the complete response may be greater than or equal to the threshold probability based on the additional information in the same type as that of the sample additional information being acquired. Therefore, the electronic apparatus 100 may acquire the additional information in the same type as that of the sample additional information. The sample additional information may be information acquired before the user input is received, and the additional information may be information acquired after the user input is received.

FIG. 24 is a flowchart for explaining an operation of acquiring the input prompt using a user log.

Operations S2410, S2440, S2441, S2442, S2443, and S2450 of FIG. 24 may correspond to the operations S1710, S1740, S1741, S1742, S1743, and S1750 of FIG. 17. The description thus may omit redundant descriptions thereof.

After acquiring the user input, the electronic apparatus 100 may acquire a user log at operation S2415. The user log may indicate history information showing the user uses the electronic apparatus 100. The user log may include at least one of a user conversation list, a list of applications used by the user, and a list of instructions executed by the electronic apparatus 100.

The electronic apparatus 100 may select a sample prompt based on the user log and the user input at operation S2421. The electronic apparatus 100 may acquire the additional information based on the user log and the user input at operation S2431.

The electronic apparatus 100 may then perform the operations S2440 to S2450.

Figure 25:
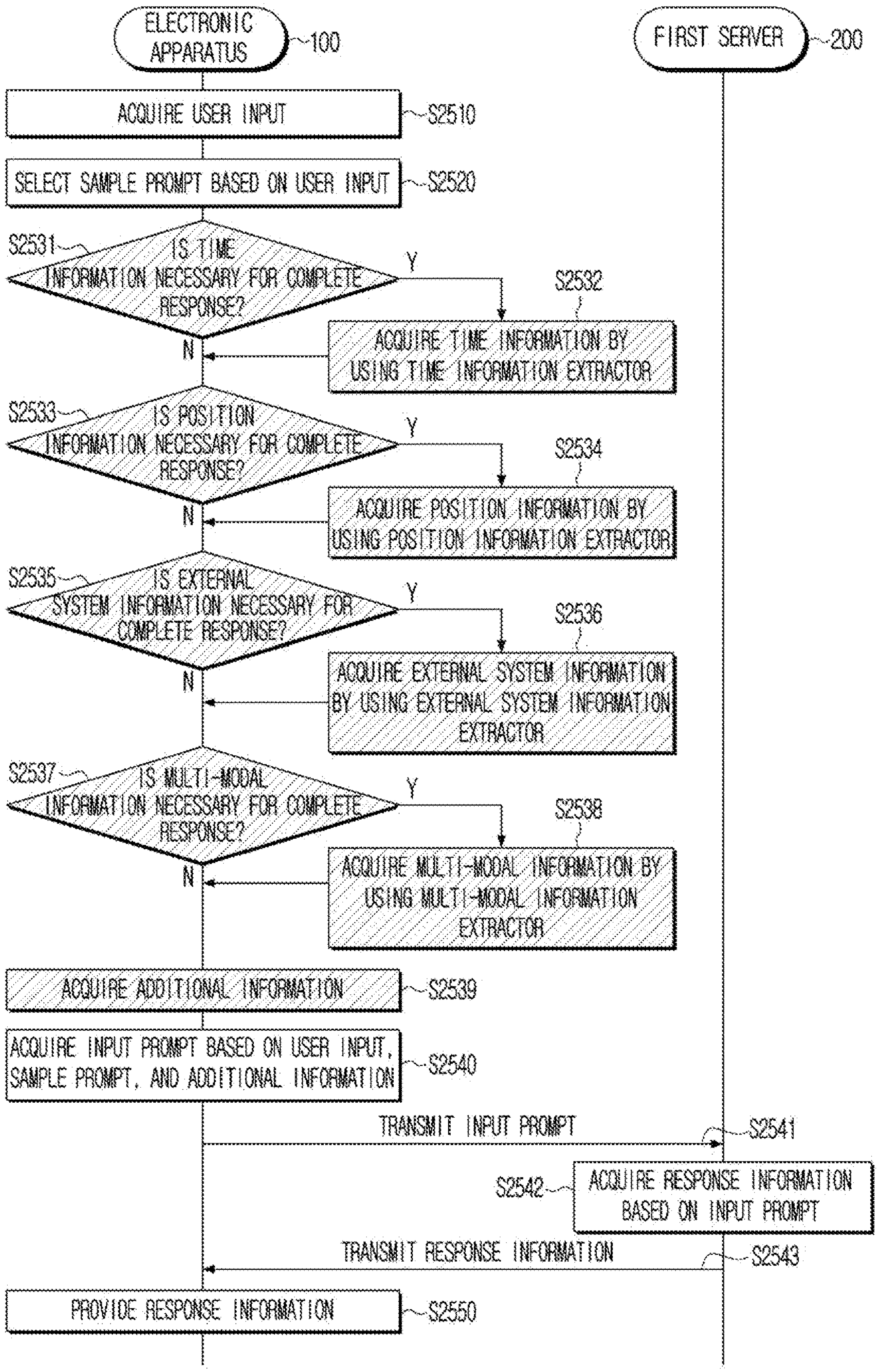
FIG. 25 is a flowchart for explaining an operation of acquiring the additional information, according to an embodiment.

FIG. 25 is a flowchart for explaining an operation of acquiring the additional information.

Operations S2510, S2520, S2540, S2541, S2542, S2543, and S2550 of FIG. 25 may correspond to the operations S1710, S1720, S1740, S1741, S1742, S1743, and S1750 of FIG. 17.

After acquiring the user input, the electronic apparatus 100 may determine whether time information is necessary for a complete response at operation S2531. Based on the time information being necessary for the complete response (Y at operation S2531), the electronic apparatus 100 may acquire the time information using a time information extractor at operation S2532. After acquiring the time information using the time information extractor, the electronic apparatus 100 may determine whether position information is necessary for the complete response at operation S2533.

In addition, based on the time information being not necessary for the complete response (N at operation S2531), the electronic apparatus 100 may determine whether the position information is necessary for the complete response at operation S2533.

Based on the position information being necessary for the complete response (Y at operation S2533), the electronic apparatus 100 may acquire the position information using a position information extractor at operation S2534. After acquiring the position information using the position information extractor, the electronic apparatus 100 may determine whether external system information is necessary for the complete response at operation S2535.

In addition, based on the position information being not necessary for the complete response (N at operation S2533), the electronic apparatus 100 may determine whether the external system information is necessary for the complete response at operation S2535.

Based on the external system information being necessary for the complete response (Y at operation S2535), the electronic apparatus 100 may acquire the external system information using an external system information extractor at operation S2536. After acquiring the external system information using the external system information extractor, the electronic apparatus 100 may determine whether multi-modal information is necessary for the complete response at operation S2537.

In addition, based on the information from an external system is not necessary for the complete response (N at operation S2535), the electronic apparatus 100 may determine whether the multi-modal information is necessary for the complete response at operation S2537.

Based on the multi-modal information being necessary for the complete response (Y at operation S2537), the electronic apparatus 100 may acquire the multi-modal information using a multi-modal information extractor at operation S2538. After acquiring the multi-modal information using the multi-modal information extractor, the electronic apparatus 100 may acquire additional information at operation S2539.

In addition, based on the multi-modal information being not necessary for the complete response (N at operation S2537), the electronic apparatus 100 may acquire the additional information at operation S2539.

For example, the electronic apparatus 100 may acquire the additional information based on at least one of the time information, the position information, the information from the external system, and the multi-modal information.

The electronic apparatus 100 may then perform the operations S2540 to S2550.

Figure 26:
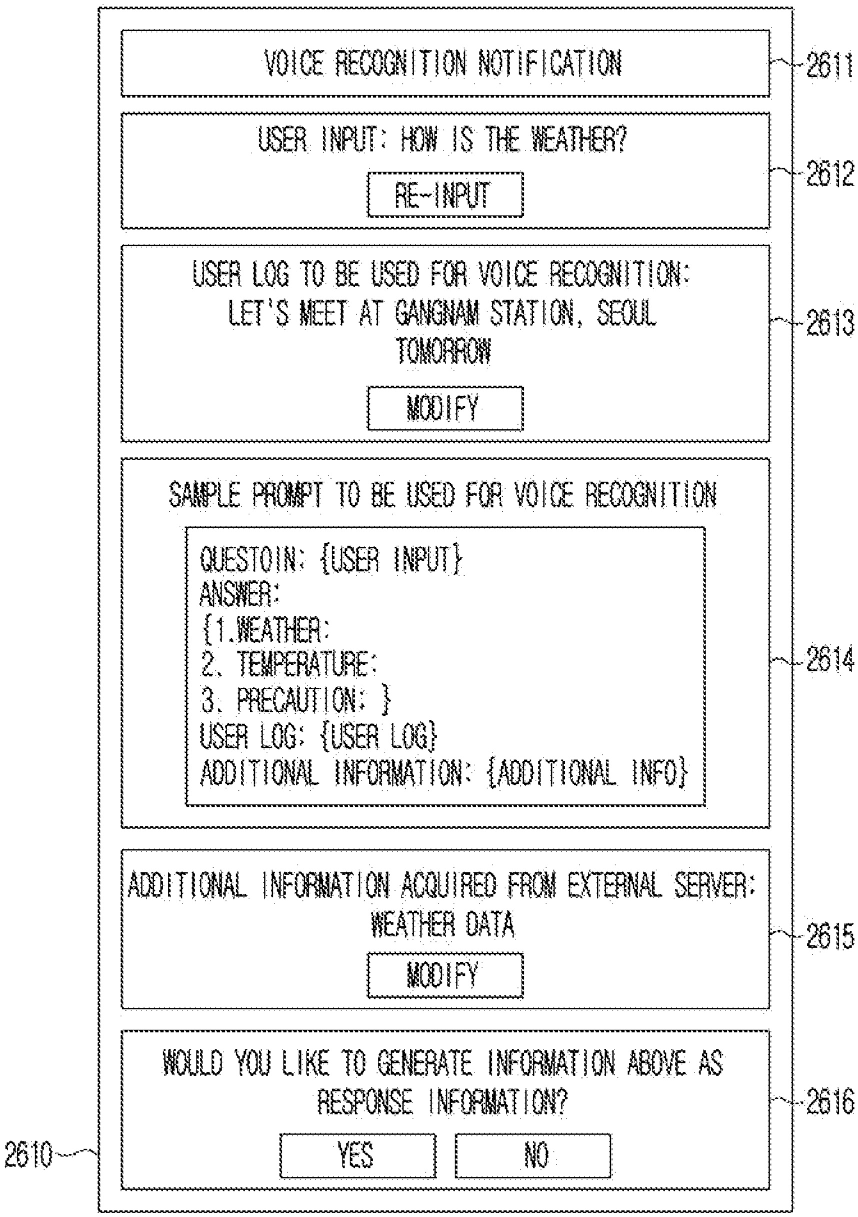
FIG. 26 is a view for explaining a user interface (UI) for displaying information used to acquire the input prompt, according to an embodiment.

FIG. 26 is a view for explaining a user interface (UI) for displaying information used to acquire the input prompt.

Referring to FIG. 26, the electronic apparatus 100 may provide the user with a screen 2610 for generating the input prompt. The screen 2610 may include at least one of a UI 2611 representing voice recognition notification, a UI 2612 representing the user input, a UI 2613 representing the user log, a UI 2614 representing the sample prompt, a UI 2615 representing the additional information, and a UI 2616 for receiving the user input to generate the response information.

The electronic apparatus 100 may receive a user command for re-inputting the user input through the UI 2612. In addition, the electronic apparatus 100 may receive a user command for modifying the user log through the UI 2613. In addition, the electronic apparatus 100 may receive a user command for modifying the additional information through the UI 2615.

Figure 27:
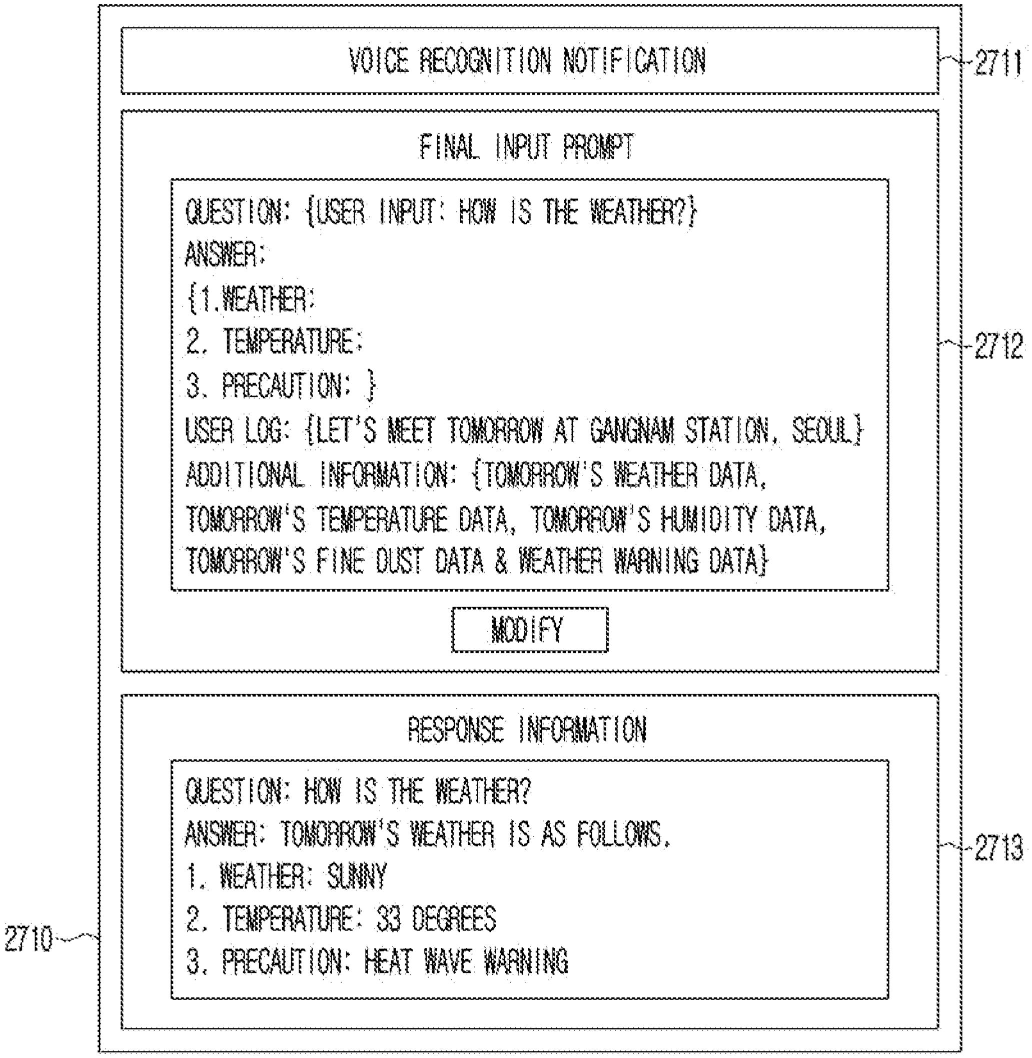
FIG. 27 is a view for explaining user interfaces (UI) for displaying the input prompt and the response information, according to an embodiment.

FIG. 27 is a view for explaining the user interfaces (UI) for displaying the input prompt and the response information.

Referring to FIG. 27, the electronic apparatus 100 may provide the user with a screen 2710 related to the response information. The screen 2710 may include at least one of a UI 2711 representing the voice recognition notification, a UI 2712 representing the input prompt, and a UI 2713 representing the response information.

In addition, the electronic apparatus 100 may receive the user command for modifying the input prompt through the UI 2712. Based on the provided response information not including information desired by the user, the user may request new response information by modifying the input prompt.

Figure 28:
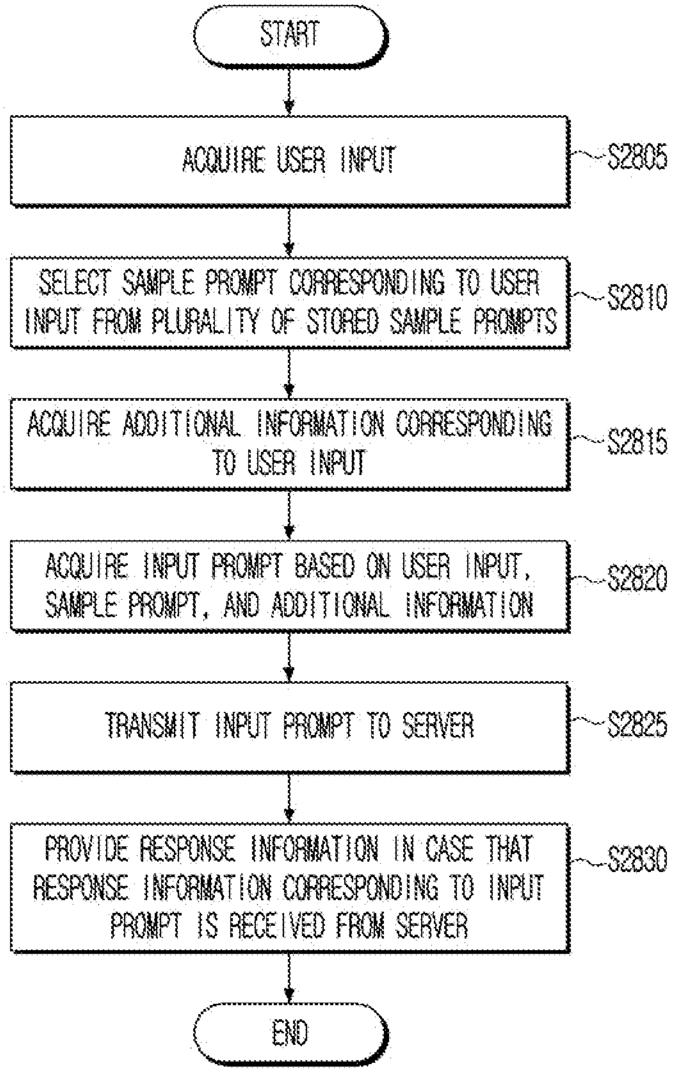
FIG. 28 is a flowchart for explaining a controlling method of an electronic apparatus according to an embodiment.

FIG. 28 is a flowchart for explaining a controlling method of an electronic apparatus 100 according to various embodiments.

Referring to FIG. 28, the controlling method of an electronic apparatus configured to store a plurality of sample prompts and communicate with a server including a large language model may include: acquiring user input, for example user input of a user, at operation S2805; selecting a sample prompt corresponding to the user input from the plurality of stored sample prompts at operation S2810; acquiring additional information corresponding to the user input at operation S2815; acquiring an input prompt based on the user input, the sample prompt, and the additional information at operation S2820; transmitting the input prompt to the server at operation S2825; and based on the response information corresponding to the input prompt being received from the server, providing the response information at operation S2830. For example, the response information may be provided to a user.

In embodiments, the sample prompt may include at least one of description information representing the sample prompt, at least one piece of example information, and response structure information.

In embodiments, the selecting of the sample prompt at operation S2810 may include: identifying a task corresponding to the user input, and selecting the sample prompt based on the identified task.

In embodiments, the server may be a first server, and the acquiring of the additional information at operation S2815 may include: determining whether the additional information corresponding to the user input is to be used, transmitting a signal requesting the additional information to the second server based on the additional information being determine to be used, and receiving the additional information from the second server.

In embodiments, the acquiring of the additional information at operation S2815 may include: acquiring the first probability of generating the complete response based on the user input, and acquiring the additional information based on the first probability being less than a threshold probability.

In embodiments, the acquiring of the additional information at operation S2815 may include: acquiring a second probability of generating the complete response based on the user input and at least one piece of sample additional information among the plurality of pieces of sample additional information; and acquiring the additional information based on at least one piece of sample additional information based on the second probability being greater than or equal to the threshold probability.

In embodiments, the acquiring of the input prompt at operation S2820 may include: acquiring the input prompt by combining the sample prompt with the user input and the additional information.

In embodiments, the identifying of the sample prompt at operation S2810 may include: acquiring a user log corresponding to user activity within a threshold time, and selecting the sample prompt corresponding to the user input based on the user log and the user input.

In embodiments, the acquiring of the additional information at operation S2815 may include: acquiring the user log corresponding to user activity within the threshold time, and acquiring the additional information based on the user log and the user input.

In embodiments, the user input may include at least one of audio information, text information, and image information.

In embodiments, the controlling method of an electronic apparatus as shown in FIG. 28 may be performed by the electronic apparatus 100 having the configuration of FIG. 2 or 3, and may also be performed by an electronic apparatus having another configuration.

In embodiments, the methods according to the various embodiments of the disclosure described above may be implemented in the form of an application which may be installed on an electronic apparatus.

In addition, the methods according to the various embodiments of the disclosure described above may be implemented only by software upgrade or hardware upgrade of the electronic apparatus.

In addition, the various embodiments of the disclosure described above may be performed through an embedded server included in the electronic apparatus, or an external server of at least one of the electronic apparatus and the display device.

In embodiments, according to the various embodiments of the disclosure, the various embodiments described above may be implemented in software including an instruction stored in a machine-readable storage medium (for example, a computer-readable storage medium). A machine may be a device that invokes the stored instruction from a storage medium, may be operated based on the invoked instruction, and may include the electronic apparatus according to the disclosed embodiments. Based on the instruction being executed by the processor, the processor may directly perform a function corresponding to the instruction, or other components may perform the function corresponding to the instruction under a control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to one or more embodiments of the disclosure, the methods according to the various embodiments described above may be included and provided in a computer program product. The computer program product may be traded as a product between a seller and a purchaser. The computer program product may be distributed in a form of the machine-readable storage medium (for example, a compact disc read only memory (CD-ROM)), or may be distributed online through an application store (for example, Play Store™). Based on the online distribution, at least a part of the computer program product may be at least temporarily stored or temporarily provided in a storage medium such as a memory of a server of a manufacturer, a server of an application store or a relay server.

In addition, each component (e.g., module or program) in the various embodiments described above may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although specific embodiments of the disclosure are shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications should also be understood to fall within the scope and spirit of the disclosure.

What is claimed is:

1. An electronic apparatus comprising:

a communication interface configured to communicate with a first server comprising a language model; and at least one processor configured to:

obtain user input acquired from a user, select a sample prompt related to the user input from a stored plurality of sample prompts, wherein the sample prompt includes response structure information indicating a format of information to be included in a response generated based on the sample prompt, determine whether additional information is necessary for providing a response corresponding to the user input, transmit a signal requesting the additional information to a second server using the communication interface based on determining that the additional information is to be used, receive the additional information from the second server using the communication interface, obtain an input prompt by combining the user input acquired from the user with the sample prompt selected by the at least one processor and the additional information, transmit the input prompt to the first server using the communication interface, receive response information from the first server using the communication interface, wherein the response information corresponds to output data that is generated according to the response structure information by providing the input prompt as input to the language model, and provide the response information to the user.

2. The electronic apparatus as claimed in claim 1, wherein the sample prompt comprises at least one of description information representing the sample prompt, example information, and the response structure information.

3. The electronic apparatus as claimed in claim 1, wherein the at least one processor is further configured to:

identify a task corresponding to the user input, and select the sample prompt based on the identified task.

4. The electronic apparatus as claimed in claim 1, wherein the at least one processor is further configured to:

acquire a first probability of generating a complete response based on the user input, and acquire the additional information based on the first probability being less than a threshold probability.

5. The electronic apparatus as claimed in claim 4, wherein the at least one processor is further configured to:

acquire a second probability of generating the complete response based on the user input and at least one piece of sample additional information from among a plurality of pieces of sample additional information, and acquire the additional information based on the at least one piece of sample additional information based on the second probability being greater than or equal to the threshold probability.

6. The electronic apparatus as claimed in claim 1, wherein the at least one processor is further configured to:

acquire a user log corresponding to user activity within a threshold time, and select the sample prompt based on the user log and the user input.

7. The electronic apparatus as claimed in claim 1, wherein the at least one processor is further configured to:

acquire a user log corresponding to user activity within a threshold time, and acquire the additional information based on the user log and the user input.

8. The electronic apparatus as claimed in claim 1, wherein the user input comprises at least one of audio information, text information, and image information.

9. A method of controlling an electronic apparatus configured to communicate with a first server including a language model, the method comprising:

obtaining user input acquired from a user;

selecting a sample prompt related to the user input from a stored plurality of sample prompts, wherein the sample prompt includes response structure information indicating a format of information to be included in a response generated based on the sample prompt;

determining whether additional information is necessary for providing a response corresponding to the user input;

transmitting a signal requesting the additional information to a second server based on the additional information being determined to be used;

receiving the additional information from the second server;

obtaining an input prompt by combining the user input acquired from the user with the selected sample prompt, and the additional information;

transmitting the input prompt to the first server;

receiving response information from the first server, wherein the response information corresponds to output data that is generated according to the response structure information by providing the input prompt as input to the language model; and providing the response information to the user.

10. The method as claimed in claim 9, wherein the sample prompt comprises at least one of description information representing the sample prompt, at least one example information, and the response structure information.

11. The method as claimed in claim 9, wherein the selecting of the sample prompt comprises:

identifying a task corresponding to the user input, and selecting the sample prompt based on the identified task.

12. The method as claimed in claim 9, wherein the acquiring of the additional information comprises:

acquiring a first probability of generating a complete response based on the user input, and acquiring the additional information based on the first probability being less than a threshold probability.

* * * * *